United States Patent
Zhang et al.

(10) Patent No.: US 11,206,628 B2
(45) Date of Patent: Dec. 21, 2021

(54) METHOD AND EQUIPMENT FOR SELECTING SYNCHRONIZATION REFERENCE SOURCE FOR MULTI-CARRIER SIDELINK COMMUNICATION

(71) Applicant: Samsung Electronics Co., Ltd., Suwon-si (KR)

(72) Inventors: Shichang Zhang, Beijing (CN); Yingyang Li, Beijing (CN); Yi Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 16/652,367

(22) PCT Filed: Sep. 27, 2018

(86) PCT No.: PCT/KR2018/011397
§ 371 (c)(1),
(2) Date: Mar. 30, 2020

(87) PCT Pub. No.: WO2019/066475
PCT Pub. Date: Apr. 4, 2019

(65) Prior Publication Data
US 2020/0322910 A1    Oct. 8, 2020

(30) Foreign Application Priority Data

Sep. 28, 2017  (CN) .......................... 201710900782.8
Oct. 31, 2017  (CN) .......................... 201711050642.2
(Continued)

(51) Int. Cl.
H04W 56/00    (2009.01)
H04W 76/11    (2018.01)
(Continued)

(52) U.S. Cl.
CPC ......... *H04W 56/0015* (2013.01); *H04W 4/40* (2018.02); *H04W 72/005* (2013.01);
(Continued)

(58) Field of Classification Search
CPC ..... H04W 56/0015; H04W 4/40; H04W 4/70; H04W 76/11; H04W 76/14
See application file for complete search history.

(56) References Cited

U.S. PATENT DOCUMENTS

2017/0272299 A1  9/2017 Chae et al.
2017/0289935 A1* 10/2017 Yoon ....................... G01S 19/13
(Continued)

FOREIGN PATENT DOCUMENTS

KR    10-2016-0037038 A    4/2016
KR    10-2017-0048415 A    5/2017
(Continued)

OTHER PUBLICATIONS

NTT Docomo, Inc., "Discussion on synchronization for carrier aggregation", 3GPP TSG RAN WG1 Meeting #90, Aug. 21-25, 2017, R1-1713881, 4 pages.
(Continued)

*Primary Examiner* — Min Jung

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart-city, smart-car, connected car, health care, digital education, smart retail, security and safety services.

The present invention discloses a method for selecting a synchronization reference source for multi-carrier sidelink
(Continued)

communication, including: selecting a synchronization reference source according to a status of a UE on multiple carriers; and using the selected synchronization reference source as a synchronization reference source for the UE on all carriers.

15 Claims, 2 Drawing Sheets

(30) Foreign Application Priority Data

Apr. 2, 2018 (CN) .......................... 201810284791.3
May 9, 2018 (CN) .......................... 201810438003.1

(51) Int. Cl.
H04W 4/40 (2018.01)
H04W 76/27 (2018.01)
H04W 72/00 (2009.01)
H04W 92/18 (2009.01)

(52) U.S. Cl.
CPC ............ *H04W 76/11* (2018.02); *H04W 76/27* (2018.02); *H04W 92/18* (2013.01)

(56) References Cited

U.S. PATENT DOCUMENTS

| | | | |
|---|---|---|---|
| 2018/0213498 A1 | 7/2018 | Khoryaev et al. | |
| 2018/0220388 A1* | 8/2018 | Chae | H04W 76/14 |
| 2018/0352525 A1* | 12/2018 | Li | H04B 7/2125 |
| 2019/0045465 A1* | 2/2019 | Lee | H04W 56/001 |
| 2019/0045469 A1* | 2/2019 | Zhang | H04W 76/14 |
| 2019/0053179 A1* | 2/2019 | Taylor | H04W 56/0015 |
| 2019/0098589 A1* | 3/2019 | Chae | H04B 7/18582 |
| 2020/0053675 A1* | 2/2020 | Khoryaev | H04W 56/00 |
| 2020/0267671 A1* | 8/2020 | Chae | H04L 5/001 |

FOREIGN PATENT DOCUMENTS

| | | |
|---|---|---|
| KR | 10-2017-0088490 A | 8/2017 |
| WO | 2017052687 A1 | 3/2017 |

OTHER PUBLICATIONS

Supplementary European Search Report dated Jan. 29, 2021 in connection with European Patent Application No. 18 86 1672, 8 pages.
ISA/KR, International Search Report and Written Opinion of the International Searching Authority, International Application No. PCT/KR2018/011397, dated Jan. 10, 2019, 9 pages.
3GPP TS 36.331 V14.4.0 (Sep. 2017), Technical Specification, 3rd Generation Partnership Project; Technical Specification Group Radio Access Network; Evolved Universal Terrestrial Radio Access (E-UTRA); Radio Resource Control (RRC); Protocol specification (Release 14), Sep. 2017, 753 pages.

\* cited by examiner

METHOD AND EQUIPMENT FOR SELECTING SYNCHRONIZATION REFERENCE SOURCE FOR MULTI-CARRIER SIDELINK COMMUNICATION

CROSS-REFERENCE TO RELATED APPLICATIONS

This application is a 371 National Stage of International Application No. PCT/KR2018/011397, filed Sep. 27, 2018, which claims priority to China Patent Application No. 201710900782.8, filed Sep. 28, 2017, China Patent Application No. 201711050642.2, filed Oct. 31, 2017, China Patent Application No. 201810284791.3, filed Apr. 2, 2018, and China Patent Application No. 201810438003.1, filed May 9, 2018, the disclosures of which are herein incorporated by reference in their entirety.

BACKGROUND

1. Field

The present invention relates to the technical field of wireless communication, and in particular to a method and equipment for selecting a synchronization reference source for multi-carrier sidelink communication.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology" "wired/wireless communication and network infrastructure" "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In the 3GPP standard, a direct communication link between a User Equipment (UE) and another UE is called a sidelink. Similar to an uplink and a downlink, there are control channels and data channels on the sidelinks. The control channels are called Physical Sidelink Control Channels (PSCCHs) and the data channels are called Physical Sidelink Shared Channels (PSSCHs). The PSCCHs are used for indicating the time/frequency domain resource position and the modulation and coding scheme for PSSCH transmission, the priority of data borne in a PSSCH or more, and the PSSCHs are used for bearing data. In the current 3GPP standard, sidelink communication includes direct Device to Device communication (D2D) and Vehicle to vehicle/pedestrian/infrastructure/network (V2X) communication.

For a UE involving in sidelink communication, when certain conditions are met, it is necessary to transmit a Sidelink Synchronization Signal (SLSS) on synchronous resources which are configured by a cell or pre-configured by the UE to provide other UEs with a subframe-level synchronization signal source. Meanwhile, for a UE performing sidelink communication on a certain carrier, it is necessary to select a corresponding synchronization reference source according to the current status.

SUMMARY

In order to increase the system data transmission rate and the system capacity, it is necessary to use the sidelink carrier aggregation, so that a UE can transmit V2X data on multiple carriers. In the sidelink carrier aggregation, each V2X service can correspond to one or more carriers, and a UE access layer determines the correspondence between a service and a carrier according to information provided by a UE higher layer. When the sidelink carrier aggregation is used, multiple sidelink carriers may belong to a same frequency band and there is in-band interference between each other. If there is no enough spacing between multiple carriers which belong to a same frequency band, a UE cannot perform transmitting and receiving simultaneously on multiple carriers. That is, there is half-duplex constraint between multiple carriers. Therefore, the requirement of the sidelink carrier aggregation is that subframe boundaries of multiple carriers belonging to a same frequency band are aligned, so that the influence caused by the in-band interference and the half-duplex constraint is reduced.

In the current V2X system, the selection of a synchronization reference source is performed independently on each carrier for V2X communication. In a case where there are multiple carriers, the current synchronization mechanism cannot ensure time synchronization between multiple carriers. Accordingly, it is necessary to provide a method and equipment for selecting a synchronization reference source for multi-carrier sidelink communication to solve the above technical problems.

An objective of the present invention is to overcome the deficiencies of the prior art and to provide a method and equipment for selecting a synchronization reference source for multi-carrier sidelink communication which can effectively improve the transmission performance of a sidelink communication system.

For this purpose, the present invention provides a method for selecting a synchronization reference source for multi-carrier sidelink communication, including the following steps of:

selecting a synchronization reference source according to a status of a User Equipment (UE) on multiple carriers; and using the selected synchronization reference source as a synchronization reference source for the UE on all carriers.

Preferably, a cell coverage attribute of the UE on all carriers is determined according to the cell coverage status of the UE on multiple carriers;

a synchronization reference source is selected according to a cell coverage attribute of the UE on all carriers.

Preferably, the step of selecting a synchronization reference source according to a status of a UE on multiple carriers includes:

determining priority order of synchronization reference sources according to the status of the UE on multiple carriers; and selecting a synchronization reference source according to the priority order.

Preferably, the step of determining priority order of synchronization reference sources according to the status of the UE on multiple carriers includes:

determining a cell coverage attribute of the UE on all carriers according to the cell coverage status of the UE on multiple carriers; and determining priority order of synchronization reference sources according to the cell coverage attribute of the UE on all carriers.

Preferably, the step of determining a cell coverage attribute of the UE on all carriers according to the cell coverage status of the UE on multiple carriers includes:

determining the cell coverage attribute of the UE on all carriers as In Coverage User Equipment (ICUE), if there is a carrier on which the UE is in coverage of a cell among multiple carriers;

determining the cell coverage attribute of the UE on all carriers as Partial Coverage User Equipment (PCUE), if the UE is out of coverage on all carriers and an available carries list for vehicle to vehicle/pedestrian/infrastructure/network communication included in a system message or an RRC reconfiguration message received by the UE contains the v2x-InterFreqInfoList containing at least one of all carriers; and or otherwise, determining the cell coverage attribute of the UE on all carriers as Out of Coverage User Equipment (OCUE).

Preferably, the step of determining priority order of synchronization reference sources according to the status of the UE on multiple carriers includes:

determining priority order for a UE to select a synchronization reference source according to the status of the UE on multiple carriers, a prioritized synchronization reference source type of the UE on all carriers, and power of synchronization reference source signal.

Preferably, the step of determining priority order of synchronization reference sources according to the status of the UE on multiple carriers includes:

determining a cell coverage attribute of the UE on all carriers according to the status of the UE on multiple carriers;

determining a prioritized synchronization reference source type of the UE on all carriers according to the cell coverage attribute of the UE on all carriers; and determining priority order for a UE to select a synchronization reference source according to the cell coverage attribute of the UE on all carriers and the prioritized synchronization reference source type of the UE on all carriers or according to the cell coverage attribute of the UE on all carriers, the prioritized synchronization reference source type of the UE on all carriers and the power of synchronization reference source signal.

Preferably, the step of determining a prioritized synchronization reference source type of the UE on all carriers according to the cell coverage attribute of the UE on all carriers includes:

determining that the prioritized synchronization reference source type of the UE on all carriers is the same as a carrier X, if the cell coverage attribute of the UE on all carriers is ICUE, wherein the cell coverage attribute of the UE on the carrier X is ICUE;

determining that the prioritized synchronization reference source type of the UE on all carriers is the same as a carrier Y, if the cell coverage attribute of the UE on all carriers is PCUE, wherein the cell coverage attribute of the UE on the carrier Y is PCUE, and the priority of the carrier Y is the highest, wherein the priority of Y is indicated by higher layer, or the index value of the carrier Y is the lowest; and determining that the prioritized synchronization reference source type of the UE on all carriers is the same as a carrier Z, if the cell coverage attribute of the UE on all carriers is OCUE, wherein the priority of the carrier Z is the highest, wherein the priority of Z is indicated by higher layer, or the index value of the carrier Z is the lowest.

Preferably, the step of determining priority order for a UE to select a synchronization reference source according to the cell coverage attribute of the UE on all carriers and the prioritized synchronization reference source type of the UE on all carriers includes: grouping all carriers into a carrier set G, determining priority order for a first UE to select a synchronization reference source as follows: from high priority to low priority, a primary carrier on which the cell coverage status of the first UE is ICUE in the carrier set G, a secondary carrier on which the cell coverage status of the first UE is ICUE in the carrier set G, and other carriers on which the cell coverage status of the first UE is ICUE in the carrier set G, if the cell coverage attribute of the first UE is ICUE and the prioritized synchronization reference source type of the first UE is a base station in the carrier set G; or determining priority order for a first UE to select a synchronization reference source as follows: from high priority to low priority, a GNSS, a second UE which transmits a Sidelink Synchronization Signal (SLSS) with a Sidelink Synchronization Signal ID SLSSID=0 on a carrier in the carrier set G, and a base station, if the cell coverage attribute of the first UE is ICUE and the prioritized synchronization reference source type of the first UE is a Global Navigation Satellite System (GNSS) in the carrier set G; or determining priority order for a first UE to select a synchronization reference source as follows: from high priority to low priority, a GNSS, a second UE which transmits an SLSS with an SLSSID=0 on a carrier in the carrier set G, and a base station, if the cell coverage attribute of the first UE is PCUE and the prioritized synchronization reference source type of the first UE is a GNSS in the carrier set G; or determining priority order for a first UE to select a synchronization reference source as follows: from high priority to low priority, a second UE which transmits an SLSS with an SLSSID belonging to a first set on a carrier in the carrier set G, a GNSS, a second UE which transmits an SLSS with an SLSSID=0 on a carrier in the carrier set G, and other second UEs which transmit SLSSs on a carrier in the carrier set G, if the cell coverage attribute of the first UE is OCUE and the prioritized synchronization reference source type of the first UE is a base station in the carrier set G; or determining priority order for a first UE to select a synchronization reference source as follows: from high priority to low priority, a GNSS, a second UE which transmits a Physical Sidelink Broadcast Channel (PSBCH) on a carrier in the carrier set G and a coverage status indication field inCoverage of the PSBCH is set to TRUE, or a second UE which transmits an SLSS on a carrier in the carrier set G and on a subframe which is indicated by a pre-configured parameter a third synchronization transmitting subframe offset syncOffsetIndicator3, a second UE which transmits a PSBCH in the carrier set G and a coverage status indication field inCoverage of the PSBCH is set to FALSE, and other second UEs which transmit SLSSs on a carrier in the carrier set G, if the cell coverage attribute of the first UE is OCUE and the prioritized synchronization reference source type of the first UE is a GNSS in the carrier set G; and the first set is a set of SLSSIDs for in coverage UE.

Preferably, the step of determining priority order for a UE to select a synchronization reference source according to the cell coverage attribute of the UE on all carriers and the prioritized synchronization reference source type of the UE on all carriers includes: grouping all carriers into a carrier set G, and determining priority order for a first UE to select a synchronization reference source as follows, if the cell coverage attribute of the first UE is ICUE and the prioritized synchronization reference source type of the first UE is a GNSS in the carrier set G: from high priority to low priority, a GNSS;

a second UE which transmits an SLSS with an SLSSID=0 on a carrier in the carrier set G, or a second UE which transmits an SLSS with an SLSSID=0 on a carrier A in the carrier set G, wherein the cell coverage attribute of the first UE on the carrier A is ICUE or PCUE, or a second UE which transmits an SLSS with an SLSSID=0 on a carrier A in the carrier set G, wherein the cell coverage attribute of the first UE on the carriers A is ICUE or PCUE and the priority of the carrier A indicated by higher layer is the highest;

a reference cell.

Preferably, the step of determining priority order for a UE to select a synchronization reference source according to the cell coverage attribute of the UE on all carriers and the prioritized synchronization reference source type of the UE on all carriers includes: grouping all carriers into a carrier set G, and determining priority order for a first UE to select a synchronization reference source as follows, if the cell coverage attribute of the first UE is PCUE and the prioritized synchronization reference source type of the first UE is a GNSS in the carrier set G: from high priority to low priority, a GNSS;

a second UE which transmits an SLSS with an SLSSID=0 on a carrier in the carrier set G, or a second UE which transmits an SLSS with an SLSSID=0 on a carrier A in the carrier set G, wherein the cell coverage attribute of the first UE on the carrier A is PCUE, or a second UE which transmits an SLSS with an SLSSID=0 on a carrier A in the carrier set G, wherein the cell coverage attribute of the first UE on the carrier A is PCUE and the priority of the carrier A indicated by higher layer is the highest;

a reference cell.

Preferably, the step of determining priority order for a UE to select a synchronization reference source according to the cell coverage attribute of the UE on all carriers and the prioritized synchronization reference source type of the UE on all carriers includes: grouping all carriers into a carrier set G, and determining priority order for a first UE to select a synchronization reference source as follows, if the cell coverage attribute of the first UE is OCUE and the prioritized synchronization reference source type of the first UE is a base station in the carrier set G: from high priority to low priority, a second UE which transmits an SLSS with an SLSSID belonging to a first set on a carrier A in the carrier set G and transmits a PSBCH with inCoverage field being set to TRUE on the carrier A;

a second UE which transmits an SLSS with an SLSSID belonging to a first set on a carrier A in the set of carrier G and transmits a PSBCH with inCoverage field being set to FALSE on the carrier A;

a GNSS;

a second UE which transmits an SLSS with an SLSSID=0 on a carrier A in the carrier set G and transmits a PSBCH with inCoverage field being set to TRUE on the carrier A, or a second UE which transmits an SLSS with an SLSSID=0 on the carrier A in the carrier set G and on a subframe which is indicated by a pre-configured parameter syncOffsetIndicator3;

a second UE which transmits an SLSS with an SLSSID=0 on a carrier A in the carrier set G and on a subframe which is indicated by a pre-configured parameter syncOffsetIndicator1 or syncOffsetIndicator2 and transmits a PSBCH with inCoverage field being set to FALSE on the carrier A;

other second UEs which transmit SLSSs on a carrier in the carrier set G;

the first set is a set of SLSSIDs for in coverage UE.

Preferably, the step of determining priority order for a UE to select a synchronization reference source according to the cell coverage attribute of the UE on all carriers and the prioritized synchronization reference source type of the UE on all carriers includes: grouping all carriers into a carrier set G, and determining priority order for a first UE to select a synchronization reference source as follows, if the cell coverage attribute of the first UE is OCUE and the prioritized synchronization reference source type of the first UE is a GNSS in the carrier set G: from high priority to low priority, a GNSS;

a second UE which transmits an SLSS with an SLSSID belonging to a first set or an SLSSID=0 on a carrier A in the carrier set G and transmits a PSBCH with inCoverage field being set to TRUE on the carrier A, or a second UE which transmits an SLSS with an SLSSID=0 on the carrier A in the carrier set G and on a subframe which is indicated by a pre-configured parameter syncOffsetIndicator3;

a second UE which transmits an SLSS with an SLSSID belonging to a first set on a carrier A in the carrier set G and transmits a PSBCH with inCoverage field being set to FALSE on the carrier A; or a second UE which transmits an SLSS with an SLSSID=0 on a carrier A in the carrier set G and on a subframe which is indicated by a pre-configured parameter syncOffsetIndicator1 or syncOffsetIndicator2 and transmits a PSBCH with inCoverage field being set to FALSE on the carrier A, or a second UE which transmits an SLSS with an SLSSID=169 on a carrier A in the carrier set G and transmits a PSBCH with inCoverage field being set to FALSE on the carrier A;

other second UEs which transmit SLSSs on a carrier in the carrier set G;

the first set is a set of SLSSIDs for in coverage UE.

Preferably, the step of selecting a synchronization reference source according to the priority order includes: detecting SLSSs within all SLSSID ranges on all carriers, or detecting SLSSs within all SLSSID ranges only on a carrier with the highest corresponding service priority or the lowest index, or detecting SLSSs within all SLSSID ranges only on a carrier which corresponds to a service that needs to be received by a legacy UE, and selecting a synchronization reference source according to the priority order, wherein the priority of a service corresponding to a carrier is indicated by higher layer.

Preferably, the step of selecting a synchronization reference source according to the priority order includes: selecting, according to the priority order, a detected synchronization reference source with the highest priority, if there are multiple detected UE-type synchronization reference sources with the highest priority, a UE-type synchronization reference source corresponding to an SLSS with the highest S-RSRP value is selected.

Preferably, the step of selecting a synchronization reference source according to the priority order includes: selecting, according to the priority order, a detected synchronization reference source with the highest priority, if there are multiple detected UE-type synchronization reference sources with the highest priority, a UE-type synchronization reference source with the highest S-RSRP is selected, or a UE-type synchronization reference source with the highest S-RSRP on a carrier with the highest corresponding service priority is selected, wherein the priority of a service corresponding to a carrier is indicated by higher layer.

For this purpose, the present invention further provides a user equipment, includes:

a synchronization reference source selection module, configured to select a synchronization reference source according to a status of a User Equipment (UE) on multiple carriers; and a synchronization reference source application module, configured to use the selected synchronization reference source as a synchronization reference source for the UE on all carriers.

Compared with the prior art, the technical effects of the present invention include, but are not limited to: a synchronization reference source is selected according to the status of an equipment on multiple carriers, and the synchronization reference source is detected and acquired on each carrier by using this strategy, so that a same equipment can refer to a same synchronization reference source on all carriers in the carrier set to achieve time synchronization. The influence caused by the in-band interference and the half-duplex constraint is significantly reduced and the communication efficiency and the transmission performance of a sidelink communication system are effectively improved.

BRIEF DESCRIPTION OF THE DRAWINGS

To describe the technical solutions in the embodiments of the present invention more clearly, the accompanying drawings to be used in the description of the embodiments will be briefly described below. Apparently, the accompanying drawings described hereinafter are some of the embodiments of the present invention, and those skilled in the art can acquire other accompanying drawings according to these drawings without any creative effort.

DETAILED DESCRIPTION

Figure 1:
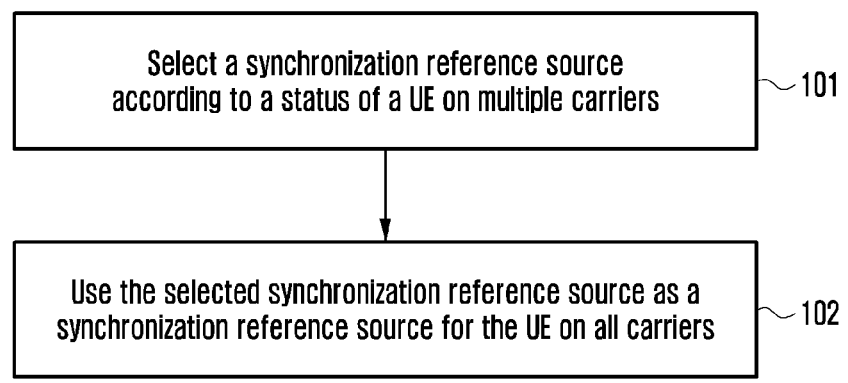
FIG. 1 is a flowchart of a method for selecting a synchronization reference source for multi-carrier sidelink communication according to the present invention.

Embodiments of the present disclosure will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present disclosure and should not be regarded as any limitations thereto.

It should be understood by those skilled in the art that singular forms "a", "an", "said", and "the" may be intended to include plural forms as well, unless otherwise stated. It should be further understood that terms "comprise/comprising" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it can be directly connected or coupled to other elements or provided with intervening elements therebetween. In addition, "connected to" or "coupled to" as used herein can comprise wireless connection or coupling. As used herein, the term "and/or" comprises all or any of one or more associated listed items or combinations thereof.

It should be understood by those skilled in the art that, unless otherwise defined, all terms (including technical and scientific terms) used herein have the same meaning as commonly understood by one person of ordinary skill in the art to which the present disclosure belongs. It should be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by those skilled in the art that the term "terminal" and "terminal equipment" as used herein compasses not only devices with a wireless signal receiver having no emission capability but also devices with receiving and emitting hardware capable of carrying out bidirectional communication over a bidirectional communication link. Such devices can comprise cellular or other communication devices with a single-line display or multi-line display or without a multi-line display; Personal Communication Systems (PCSs) with combined functionalities of speech, data processing, facsimile and/or data communication; Personal Digital Assistants (PDAs), which may include RF receivers, pagers, internet networks/intranet accesses, web browsers, notepads, calendars and/or Global Positioning System (GPS) receivers; and/or conventional laptop and/or palmtop computers or other devices having and/or including a RF receiver. The "terminal" and "terminal equipment" as used herein can be portable, transportable, mountable in transportations (air, sea and/or land transportations), or suitable and/or configured to run locally and/or distributed in other places in the earth and/or space for running. The "terminal" or "terminal equipment" as used herein may be a communication terminal, an internet terminal, a music/video player terminal. For example, it can be a PDA, a Mobile Internet Device (MID) and/or a mobile phone with a music/video playback function, or can be equipment such as a smart TV and a set-top box.

In the disclosed technology for a sidelink communication system, for a UE involving in sidelink communication, in order to realize the synchronization between different UEs at a subframe level, the UE needs to transmit a Sidelink Synchronization Signal (SLSS) on synchronous resources which are configured by a cell or pre-configured by the UE when the UE meets certain conditions, for example, when the UE receives a specific signaling indication from a base station (an eNB), or when the UE is located in the cell edge, or when the UE is out of coverage of a cell and uses a Global Navigation Satellite System (GNSS) as a synchronization reference source. Wherein, the SLSS includes a Primary Sidelink Synchronization Signal (PSSS) and a Secondary Sidelink Synchronization Signal (SSSS). The PSSS uses a root sequence with a length of 62 or a Zadoff-Chu (ZC) sequence with indices of 26 and 37, and the SSSS consists of two m-sequences with a length of 31. The two m-sequences are uniquely determined by the indices corresponding to the SSSS.

Within a subframe on which the SLSS is transmitted, the SLSS occupies four Single-Carrier Frequency-Division Multiple Access (SC-FDMA) symbols in the subframe. Except for the first and the last SC-FDMA symbols, other SC-FDMA symbols will be used for the transmission of a Physical Sidelink Broadcast Channel (PSBCH) and demodulation reference signals thereof. Wherein, the PSBCH is used for bearing a sidelink subframe number, system bandwidth, cell TDD configuration, synchronization reference source status or other information.

Meanwhile, for a UE performing sidelink communication on a certain carrier, it is necessary to select a corresponding synchronization reference source according to the current status. Particularly, in D2D communication, if the UE is in coverage of a cell on the current carrier on which sidelink communication is performed, the UE selects the cell as the synchronization reference source. That is, the UE obtains time-frequency synchronization information by a primary synchronization signal, a secondary synchronization signal and a system message of the cell. If the UE is out of coverage on the current carrier on which sidelink communication is performed, the UE searches SLSSs transmitted by other UEs on the current carrier and selects a detected UE with the highest priority which transmits an SLSS as the synchronization reference source. If there are multiple UEs with the highest priority, a UE which transmits a PSBCH with the highest Sidelink-Reference Signal Receiving Power (S-RSRP) is preferably selected.

In V2X communication, if the UE is in coverage of a cell on the current carrier on which sidelink communication is performed (hereinafter, a UE in coverage of a cell is called an ICUE), or the current carrier on which sidelink communication is performed is contained in v2x-InterFreqInfoList in a system message 21 SystemInformationBlockType21 or an RRC reconfiguration message RRCConnectionReconfiguration transmitted by a serving cell or a primary cell (hereinafter, a UE which is in the above status is called a PCUE, and an OUCE is a collective term of UEs except for ICUEs and PCUEs), if the prioritized synchronization reference source on this carrier is a base station (that is, the typeTxSync configuration for this carrier is an eNB or a gNB), the UE selects a cell as the synchronization reference source;

if the prioritized synchronization reference source type on this carrier is a GNSS (that is, the typeTxSync configuration for this carrier is a GNSS) and the UE can detect reliable GNSS signals, the UE selects a GNSS as the synchronization reference source; otherwise (the UE doesn't detect reliable GNSS signals), the UE detects an SLSS with an SLSSID=0 on the carrier. If an SLSS with power which meets the requirement can be detected, a UE which transmits the SLSS is selected as the synchronization reference source; if the UE doesn't detect reliable GNSS signals and a reliable SLSS with an SLSSID=0, the UE selects a cell as the synchronization reference source.

In addition, in V2X communication, if the UE is out of coverage on the current carrier on which sidelink communication is performed, and the prioritized synchronization reference source type on this carrier is a GNSS (that is, the syncPriority configuration for this carrier in the pre-configuration of the UE is a GNSS), the UE selects a GNSS as the synchronization reference source.

In addition, in the current V2X communication (which refers to V2X communication defined in the 3GPP Rel-14, similarly hereinafter), if the UE is out of coverage on the current carrier on which sidelink communication is performed, the UE detects all possible SLSSIDs on the current carrier. In this case, if the UE selects another UE as the synchronization reference source, when the UE detects a new UE with higher S-RSRP or the UE can detect a reliable GNSS with higher priority than the current synchronization reference source UE, the UE considers that no UE is selected currently as the synchronization reference source. If the UE selects a GNSS as the reference source in this case, when the UE detects a UE with S-RSRP which meets the requirement and with higher priority than the GNSS or the UE doesn't detect a reliable GNSS, the UE considers that no GNSS is selected currently as the synchronization reference source.

For the UE which doesn't select any UEs and GNSSs as the synchronization reference source, if one or more synchronization reference source UEs with power which meets the requirement can be detected or reliable GNSS signals can be detected, and an eNB is preferably considered as the synchronization reference source on the current carrier, the UE selects a synchronization reference source in a following order of priority.

Priority 1: A UE in which an SLSSID belongs to a first set and the inCoverage field in a PSBCH is TRUE. Wherein the first set is a set of SLSSIDs for in coverage UE. If there are multiple UEs which meet the above conditions, a UE with the highest S-RSRP is considered as the highest priority.

Priority 2: A UE in which an SLSSID belongs to a first set and the inCoverage field in a PSBCH is FALSE. Wherein the first set is a set of SLSSIDs for in coverage UE. If there are multiple UEs which meet the above conditions, a UE with the highest S-RSRP is considered as the highest priority.

Priority 3: A GNSS.

Priority 4: A UE in which an SLSSID=0 and the inCoverage field in a PSBCH is TRUE; or a UE which transmits an SLSS with an SLSSID=0 on a subframe which is indicated by a pre-configured parameter syncOffsetIndicator3. If there are multiple UEs which meet the above conditions, a UE with the highest S-RSRP is considered as the highest priority.

Priority 5: A UE which transmits an SLSS with an SLSSID=0 on a subframe which is indicated by a pre-configured parameter syncOffsetIndicator1 or syncOffsetIndicator2 and in which the inCoverage field in a PSBCH is FALSE. If there are multiple UEs which meet the above conditions, a UE with the highest S-RSRP is considered as the highest priority.

Priority 6: Other types of synchronization reference source UEs. If there are multiple UEs which meet the above condition, a UE with the highest S-RSRP is considered as the highest priority.

For the UE which doesn't select any UEs and GNSSs as the synchronization reference source, if one or more synchronization reference source UEs with power which meets the requirement can be detected or reliable GNSS signals can be detected, and a GNSS is preferably considered as the synchronization reference source on the current carrier, the UE selects a synchronization reference source in a following order of priority.

Priority 1: A GNSS.

Priority 2: A UE in which an SLSSID belongs to a first set and the inCoverage field in a PSBCH is TRUE, wherein the first set is a set of SLSSIDs for in coverage UE; or a UE in which an SLSSID=0 and the inCoverage field in a PSBCH is TRUE; or a UE which transmits an SLSS with an SLSSID=0 on a subframe which is indicated by a pre-configured parameter syncOffsetIndicator3. If there are multiple UEs which meet the above conditions, a UE with the highest S-RSRP is considered as the highest priority.

Priority 3: A UE in which an SLSSID belongs to a first set and the inCoverage field in a PSBCH is FALSE; or a UE which transmits an SLSS with an SLSSID=0 on a subframe which is indicated by a pre-configured parameter syncOffsetIndicator1 or syncOffsetIndicator2 and in which the inCoverage field in a PSBCH is FALSE; or a UE in which an SLSSID=169 and the inCoverage field in a PSBCH is FALSE. If there are multiple UEs which meet the above conditions, a UE with the highest S-RSRP is considered as the highest priority.

Priority 4: Other types of synchronization reference source UEs. If there are multiple UEs which meet the above condition, a UE with the highest S-RSRP is considered as the highest priority.

Known from the above description, in the current V2X system, for a UE performing V2X communication on a certain carrier, the way to select a synchronization reference source thereof is related to the status of the UE on the current carrier, for example, the UE being an ICUE, a PCUE or an OCUE on the current carrier, the UE preferably considering a GNSS or an eNB as a synchronization reference source, and the signal power of a synchronization reference source selected by the UE on the current carrier.

A method and equipment for selecting a synchronization reference source for multi-carrier sidelink communication according to the present disclosure can be applied to the implementation of time synchronization between different terminals in a multi-carrier sidelink communication system, and in particular to the process of selecting and reselecting a synchronization reference source for the V2X system.

Referring to FIG. 1, the method for selecting a synchronization reference source for multi-carrier sidelink communication according to the present disclosure includes the following steps.

Step 101: A synchronization reference source is selected according to a status of a User Equipment (UE) on multiple carriers.

Step 102: The selected synchronization reference source is used as a synchronization reference source for the UE on all carriers.

For example, the method according to the present disclosure can be divided into the following steps.

Step 201 (not shown): A cell coverage attribute of the UE which is based on a carrier set G is determined.

The UE determines the carrier set G by its own pre-configuration information, specific rules or the received configuration information transmitted by a base station. For example, the carrier set G may consist of multiple carriers available for sidelink communication which belong to a same frequency band. The number of carriers in the carrier set G is not greater than the total number of carriers available for sidelink communication which are configured by the base station or pre-configured by the UE. If the UE determines the carrier set G by pre-configuration, preferably, the position and number of subframes for transmitting SLSSs and PSBCHs, which are pre-configured on each carrier in the carrier set G, are the same.

For all carriers in the carrier set G, the prioritized synchronization reference source type may be the same. That is, if the UE determines the carrier set G by receiving the configuration information from the base station, the value of typeTxSync in the configuration information may be the same for each carrier in the carrier set G, or all carriers in the carrier set G may correspond to a same typeTxSync configuration parameter. If a first UE determines the carrier set G by the pre-configuration information, the value of syncPriority in the pre-configuration information may be the same for each carrier in the carrier set G, or all carriers in the carrier set G may correspond to a same syncPriority configuration parameter. If the first UE determines the carrier set G according to the specific rules, for example, grouping carriers which belong to a same frequency band into the carrier set G, the first UE may consider that the values of typeTxSync or syncPriority for all carriers in the carrier set G are the same as the value of typeTxSync or syncPriority for a certain carrier in the carrier set G.

In the carrier set G, each carrier corresponds to a unique carrier index, and the index value may be equal to the order in which the carrier appears in the configuration signaling or the pre-configuration signaling.

Step 202 (not shown): A prioritized synchronization reference source type of the UE which is based on the carrier set G is determined according to the cell coverage attribute.

Step 203 (not shown): Priority order for the UE to select a synchronization reference source is determined according to the cell coverage attribute and the prioritized synchronization reference source type.

Step 204 (not shown): A synchronization reference source of the UE is selected according to the priority order.

After the synchronization reference source of the UE in the carrier set G is determined, all carriers in the carrier set G determine subframe boundaries according to the synchronization reference source and may further determine Direct Frame Numbers (DFNs) and subframe numbers according to the synchronization reference source.

To easily understand the present disclosure, by several embodiments, the technical solutions of the present disclosure will be further described below with reference to specific applications, by taking an inter-equipment interaction mode as an example.

Embodiment 1

In this embodiment, a first UE determines a current cell coverage attribute, which is based on a carrier set G, according to the status on each carrier in the carrier set G, that is, the first UE belongs to an ICUE, a PCUE or an OCUE in the carrier set G. Particularly, if there is a carrier on which the first UE is in coverage of a cell in the carrier set G, the first UE belongs to an ICUE in the carrier set G. If the first UE is out of coverage of a cell on any one of carriers in the carrier set G, and v2x-InterFreqInfoList in a system message 21 or an RRC reconfiguration message, which is transmitted by a serving cell or a primary cell, received by the first UE contains at least one carrier in the carrier set G, the first UE belongs to a PCUE in the carrier set G; otherwise, the first UE belongs to an OCUE in the carrier set G.

If the first UE belongs to an ICUE in the carrier set G, the prioritized synchronization reference source type of the first UE on all carriers in the set of carrier G is the same as the configuration of a carrier X in the carrier set G, wherein the first UE is an ICUE on the carrier X. If the first UE belongs to a PCUE in the carrier set G, the prioritized synchronization reference source type of the first UE on all carriers in the set of carrier G is the same as the configuration of a carrier Y in the carrier set G, wherein the first UE is a PCUE on the carrier Y. If the first UE belongs to a PCUE on multiple carriers in the carrier set G, the carrier Y is a carrier with the highest corresponding service priority or with the lowest index value on the multiple carriers, wherein the priority of a service corresponding to a carrier is indicated by a UE higher layer (with respect to an access layer). If the first UE belongs to an OCUE in the carrier set G, the prioritized synchronization reference source type of the first UE on all carriers in the set of carrier G is the same as the configuration of a carrier Z in the carrier set G, where the carrier Z is a carrier with the highest priority or with the lowest index value, wherein the priority of a service corresponding to a carrier is indicated by a UE higher layer (with respect to an access layer).

If the first UE belongs to an ICUE in the carrier set G, and the prioritized synchronization reference source type of the UE in the carrier set G is a base station, the first UE selects a reference cell as a synchronization reference source on all carriers in the carrier set G.

In one implementation of this embodiment, the first UE selects the reference cell in the following ways.

If there is a primary carrier (primary frequency) in the carrier set G and the first UE is an ICUE on the primary carrier, a cell for the primary carrier is selected as the reference cell.

If there is no a primary carrier in the carrier set G or the first UE is a PCUE or an OCUE on the primary carrier contained in the carrier set G, but there is one or more secondary carriers (secondary frequency) contained in the carrier set G and the first UE is an ICUE on the one or more secondary carriers, a cell for a secondary carrier with the highest S-RSRP or with the highest priority is selected as the reference cell.

If there is neither a primary carrier nor a secondary carrier contained in the carrier set G or the first UE is not an ICUE on the primary carrier or the secondary carrier in the carrier set G, but the first UE belongs to an ICUE on one or more other carriers in the carrier set G, the first UE selects a cell corresponding to a carrier with the highest S-RSRP or with the highest priority in the above carriers as the reference cell.

Preferably, in this embodiment, if the first UE considers a cell corresponding to a carrier A as a reference cell for a carrier B and the first UE is an ICUE both on the carrier A and the carrier B, where A≠B, the first UE determines subframe boundaries of the carrier B only according to the carrier A, and downlink measurement is performed on the carrier A and carrier B respectively.

In another implementation of this embodiment, the first UE selects the reference cell in the following ways.

If the first UE belongs to an ICUE on one or more carriers in the carrier set G, the first UE selects a cell corresponding to a carrier with the highest corresponding service priority as the reference cell, or the first UE selects a cell corresponding to a carrier with the highest S-RSRP as the reference cell.

Embodiment 2

As another possible implementation of the present disclosure, on the basis of Embodiment 1, if the first UE is an ICUE in the carrier set G and the prioritized synchronization reference source type of the first UE in the carrier set G is a GNSS, the first UE selects a GNSS as a synchronization reference source on all carriers in the carrier set G if the first UE can detect reliable GNSS signals.

If the first UE doesn't detect reliable GNSS signals, the first UE selects a second UE which transmits an SLSS with an ID being 0 as the synchronization reference source on all carriers in the carrier set G. In one implementation of this embodiment, the first UE detects SLSSs with an SLSSID=0 on all carriers in the carrier set G. If an SLSS with an SLSSID=0 and with S-RSRP which meets the requirement can be detected, the first UE selects a second UE which transmits the SLSS as the synchronization reference source on all carriers in the carrier set G. Preferably, if the first UE can detect multiple SLSSs with an SLSSID=0 on one or more carriers, the first UE preferably selects an SLSS with the highest S-RSRP value; or a second UE with the highest S-RSRP is preferably selected from second UEs with high priority as the synchronization reference source on all carriers in the carrier set G, wherein the second UEs with high priority refer to second UEs which transmit a PSBCH with inCoverage field being set to TRUE, or second UEs which transmit an SLSS on a subframe which is indicated by a pre-configured parameter syncOffsetIndicator3. If the first UE doesn't detect an SLSS with an SLSSID=0 and with S-RSRP which meets the requirement on all carriers in the carrier set G, the first UE selects a reference cell as the synchronization reference source on all carriers in the carrier set G, wherein the way in which the first UE selects the reference cell is the same as the way of Embodiment 1.

If the first UE doesn't detect reliable GNSS signals, in another implementation of this embodiment, the first UE detects SLSSs with an SLSSID=0 on a part of carriers in the carrier set G, and the first UE belongs to an ICUE and/or a PCUE on the part of carriers. If an SLSS with an SLSSID=0 and with S-RSRP which meets the requirement can be detected, the first UE selects a second UE which transmits the SLSS as the synchronization reference source on all carriers in the carrier set G. Preferably, if the first UE can detect multiple SLSSs with an SLSSID=0 on one or more carriers, the first UE preferably selects an SLSS with the highest S-RSRP value; or a second UE with the highest S-RSRP is preferably selected from second UEs with high priority as the synchronization reference source on all carriers in the carrier set G, wherein the second UEs with high priority refer to second UEs which transmit a PSBCH with the inCoverage field set to TRUE, or second UEs which transmit an SLSS on a subframe which is indicated by a pre-configured parameter syncOffsetIndicator3. If the first UE doesn't detect an SLSS with an SLSSID=0 and with S-RSRP which meets the requirement on the part of carriers, the first UE selects a reference cell as the synchronization reference source on all carriers in the carrier set G. Or, the first UE further detects SLSSs with an SLSSID=0 on other carriers in the carrier set G. If an SLSS with S-RSRP which meets the requirement can be detected, the first UE selects a second UE which transmits the SLSS as the synchronization reference source on all carriers in the carrier set G; otherwise, the first UE selects a reference cell as the synchronization reference source on all carriers in the carrier set G, wherein the way in which the first UE selects the reference cell is the same as the way of Embodiment 1.

If the first UE doesn't detect reliable GNSS signals, in still another implementation of this embodiment, the first UE detects SLSSs with an SLSSID=0 on a reference carrier in the carrier set G, and the first UE belongs to an ICUE and/or a PCUE on the reference carrier. Moreover, the priority of a service corresponding to the reference carrier is the highest when the first UE belongs to an ICUE and/or a PCUE on multiple carriers in the carrier set G. If an SLSS with an SLSSID=0 and with S-RSRP which meets the requirement can be detected, the first UE selects a second UE which transmits the SLSS as the synchronization reference source on all carriers in the carrier set G. Preferably, if the first UE can detect multiple SLSSs with an SLSSID=0 on one or more carriers, the first UE preferably selects an SLSS with the highest S-RSRP value; or a second UE with the highest S-RSRP is preferably selected from second UEs with high priority as the synchronization reference source on all carriers in the carrier set G, wherein the second UEs with high priority refer to second UEs which transmit a PSBCH with inCoverage field being set to TRUE, or second UEs which transmit an SLSS on a subframe which is indicated by a pre-configured parameter syncOffsetIndicator3. If the first UE doesn't detect an SLSS with an SLSSID=0 and with S-RSRP which meets the requirement on the reference carrier, the first UE selects a cell corresponding to the reference carrier as the synchronization reference source on all carriers in the carrier set G.

If the first UE doesn't detect reliable GNSS signals, in yet another implementation of this embodiment, the first UE detects SLSSs with an SLSSID=0 on one or more carriers which meet at least one of the following conditions in the carrier set G.

1. The first UE detects PSCCHs and PSSCHs on the carriers.
2. The first UE performs channel sensing on the carriers.
3. PPPP (ProSe Per-Packet Priority) levels of services corresponding to the carriers are 0.
4. PPPP levels of services corresponding to the carriers are 0 or 1.
5. Values of PPPPs of services corresponding to the carriers are less than a certain specific threshold, wherein the threshold can be defined by the standard, pre-configured or configured by a base station.
6. The carriers are carriers, indicated by a base station or the pre-configuration signaling, which must receive PSCCHs and PSSCHs.
7. Services corresponding to the carriers need to be received by legacy UEs (i.e. V2X UEs of the 3GPP Rel-14).

If the first UE can detect an SLSS with an SLSSID=0 and with S-RSRP which meets the requirement, the first UE selects a second UE which transmits the SLSS as the synchronization reference source on all carriers in the carrier set G. Preferably, if the first UE can detect multiple SLSSs with an SLSSID=0 on one or more carriers, the first UE preferably selects an SLSS with the highest S-RSRP value; or a second UE with the highest S-RSRP is preferably selected from second UEs with high priority as the synchronization reference source on all carriers in the carrier set G, wherein the second UEs with high priority refer to second UEs which transmit a PSBCH with inCoverage field being set to TRUE, or second UEs which transmit an SLSS on a subframe which is indicated by a pre-configured parameter syncOffsetIndicator3. If the first UE doesn't detect an SLSS with an SLSSID=0 and with S-RSRP which meets the requirement on the part of carriers, the first UE selects a reference cell as the synchronization reference source on all carriers in the carrier set G. Or, the first UE further detects SLSSs with an SLSSID=0 on other carriers in the carrier set G. If an SLSS with S-RSRP which meets the requirement can be detected, the first UE selects a second UE which transmits the SLSS as the synchronization reference source on all carriers in the carrier set G; otherwise, the first UE selects a reference cell as the synchronization reference source on all carriers in the carrier set G, wherein the way in which the first UE selects the reference cell is the same as the way of Embodiment 1.

If the first UE has multiple aggregated carriers for sidelink communication currently, the multiple aggregated carriers form a set C, and the first UE uses a certain synchronization reference source Ry on a carrier Y in the set C as the synchronization reference source, then:

In accordance with one implementation of the present application, if the first UE meets the conditions of transmitting SLSSs and PSBCHs on the carrier Y, it is considered that the first UE meets the conditions of transmitting SLSSs and PSBCHs on all carriers in the carrier set C. If the Ry is the UE for transmitting SLSSs and PSBCHs, when the first UE transmits SLSSs and PSBCHs on a certain carrier Z in the carrier set C, the SLSS ID transmitted by the first UE on the carrier Z is SDz, wherein the SDz can be equal to SD which is determined by the first UE according to the SLSS ID and contents of PSBCHs transmitted by the Ry in a way defined in the existing standard (3GPP standard 36.331, Rel-e40). Preferably, in this case, the first UE considers that the value of the SLSS ID for SLSS transmission (i.e., the value of the SLSS ID contained in the configuration parameter set v2x-SyncConfig containing the parameter txParameters), which is configured on each carrier in the carrier set C, is the same; and the SDz can be equal to SD+Δ, wherein Δ is the difference between the value of the SLSS ID for SLSS transmission, which is configured on the carrier Z, and the value of the SLSS ID for SLSS transmission, which is configured on the carrier Y. If the Ry is a UE for transmitting SLSSs and PSBCHs, the first UE sets the value of sl-Bandwidth in a PSBCH as the bandwidth of the carrier Z when determining contents of the PSBCH transmitted on the carrier Z. The bits in the reserved bit field syncInfoReserved can be set as the value of the field configured on the carrier Z.

In accordance with another implementation of the present application, for any one carrier K in the carrier set C, the first UE selects one synchronization reference source having the highest priority on the carrier K as a synchronization reference source Ssp for transmitting SLSSs and PSBCHs, and then the first UE determines, according to the measured S-RSRP for the Ssp to transmit signals, whether the conditions of transmitting SLSSs and PSBCHs are met on the carrier Z. If the Ssp is a UE for transmitting SLSSs and PSBCHs, when the first UE transmits SLSSs and PSBCHs on the carrier K, the method for the first UE to determine the SLSS ID transmitted on the carrier K according to the SLSS ID and contents of PSBCHs transmitted by the Ssp can be the same as that defined in the existing standard (3GPP standard 36.331, Rel-e40), and the method for the first UE to determine the contents of PBCHs transmitted on the carrier K according to the SLSS ID and contents of PSBCHs transmitted by the Ssp can be the same as that defined in the existing standard (3GPP standard 36.331, Rel-e40). It is to be clarified that the synchronization reference source for transmitting SLSSs and PSBCHs is different from the synchronization reference source for the UE on all carriers as defined in the step 102. The former is only used to determine whether SLSSs and PSBCHs are to be transmitted on the current carrier, and if it is necessary to transmit, the value of the SLSS ID and the contents of PSBCHs are determined, and it is not used to determine the timing for the UE to transmit PSSCHs and PSCCHs on all aggregated carriers.

Preferably, if the first UE has multiple aggregated carriers for sidelink communication currently and the UE meets the conditions of transmitting SLSSs and PSBCHs on one or more carriers, then:

In accordance with the first implementation of the present application, the first UE should transmit SLSSs and PSBCHs on resources for transmitting SLSSs and PSBCHs corresponding to all carriers which meet the conditions. If the number of carriers on which the first UE needs to transmit SLSSs and PSBCHs simultaneously exceeds the number of current available transmitting RF links for the first UE at a certain time point, or the first UE has no capability of transmitting sidelink signals simultaneously on multiple carriers, the UE should preferably ensure transmitting of SLSSs and PSBCHs on carriers corresponding to services with high priority and give up transmitting SLSSs and PSBCHs on carriers corresponding to services with low priority.

In accordance with the second implementation of the present application, if the first UE meets the conditions of transmitting SLSSs and PSBCHs on one or more carriers, the first UE transmits SLSSs and PSBCHs only on carriers corresponding to service with PPPPs which are less than a certain specific threshold on the one or more carriers, wherein the specific threshold is defined by the standard, configured by a base station or pre-configured.

In the third implementation of the present application, the first UE should transmit SLSSs and PSBCHs on resources for transmitting SLSSs and PSBCHs corresponding to all carriers which meet the conditions. If the number of carriers on which the first UE needs to transmit SLSSs and PSBCHs simultaneously exceeds the number of current available transmitting RF links for the UE at a certain time point, or the first UE has no capability of transmitting sidelink signals simultaneously on multiple carriers, the UE should randomly select X carriers for transmitting SLSSs and PSBCHs, wherein X is the number of carriers on which the first UE can currently transmit SLSSs and PSBCHs simultaneously. Preferably, if the carriers on which the first UE needs to transmit SLSSs and PSBCHs simultaneously contain the carrier where the synchronization reference source currently selected by the UE is located, the first UE must transmit SLSSs and PSBCHs on this carrier and then randomly select X−1 carriers for transmitting SLSSs and PSBCHs from other carriers on which SLSSs and PSBCHs are to be transmitted.

In accordance with the fourth implementation of the present application, the first UE transmits SLSSs and PSBCHs at least on carriers on which services to be received by legacy UEs (which refer to V2X UEs of the Rel-14) are located.

In accordance with the fifth implementation of the present application, the first UE should transmit SLSSs and PSBCHs on resources for transmitting SLSSs and PSBCHs corresponding to all carriers which meet the conditions. If the number of carriers on which the first UE needs to transmit SLSSs and PSBCHs simultaneously exceeds the number of current available transmitting RF links for the first UE at a certain time point, or the first UE has no capability of transmitting sidelink signals simultaneously on multiple carriers, the UE selects R carriers for transmitting SLSSs and PSBCHs from carriers which meet the conditions of transmitting SLSSs and PSBCHs. The value of R and the selected R carriers should meet the following conditions:

1. the value of R should not be greater than the number of the RF links for the first UE; and 2. the R carriers should at least include the carrier Cr, wherein, if the carrier where the synchronization reference source for the first UE is located meets the conditions of transmitting SLSSs and PSBCHs, the Cr is the carrier where the synchronization reference source for the first UE is located, or otherwise, the carrier Cr is a null set (that is, it does not represent any carrier);

and 3. the first UE should support simultaneous transmission on the R carriers; and 4. the first UE should not support simultaneous transmission on any R+1 carriers, including the carrier Cr, in the carriers which meet the conditions of transmitting SLSSs and PSBCHs, or R+1 should be greater than the number of the RF links for the first UE.

If there are multiple combinations of carriers which meet the above conditions and R carriers contained in each combination are not completely the same, the first UE selects, based on its own implementation method, one combination of carriers as the carrier for transmitting SLSSs and PSBCHs, or randomly selects, from the multiple combinations of carriers which meet the above conditions, one combination of carriers for transmitting SLSSs and PSBCHs.

Embodiment 3

As another possible implementation of the present disclosure, on the basis of Embodiment 1, if the first UE is a PCUE in the carrier set G, and the prioritized synchronization reference source type of the first UE in the set of carrier G is an eNB, the first UE selects a Primary Cell (PCell) or a serving cell as a synchronization reference source on all carriers in the carrier set G.

If the first UE belongs to a PCUE in the carrier set G, and the prioritized synchronization reference source type of the first UE in the carrier set G is a GNSS and the first UE can detect reliable GNSS signals, the first UE considers a GNSS as the synchronization reference source on all carriers in the carrier set G.

If the first UE is a PCUE in the carrier set G, and the prioritized synchronization reference source type of the first UE in the carrier set G is a GNSS, but the first UE doesn't detect reliable GNSS signals, in one implementation of this embodiment, the first UE detects SLSSs with an SLSSID=0 on all carriers in the carrier set G. If an SLSS with an SLSSID=0 and with S-RSRP which meets the requirement can be detected, the first UE selects a second UE which transmits the SLSS as the synchronization reference source on all carriers in the carrier set G. Preferably, if the first UE can detect multiple SLSSs with an SLSSID=0 on one or more carriers, the first UE preferably selects an SLSS with the highest S-RSRP value; or a second UE with the highest S-RSRP is preferably selected from second UEs with high priority as the synchronization reference source on all carriers in the carrier set G, wherein the second UEs with high priority refer to second UEs which transmit a PSBCH with inCoverage field being set to TRUE, or second UEs which transmit an SLSS on a subframe which is indicated by a pre-configured parameter syncOffsetIndicator3. If the first UE doesn't detect an SLSS with an SLSSID=0 and with S-RSRP which meets the requirement on all carriers in the carrier set G, the first UE selects a PCell or a serving cell as the synchronization reference source on all carriers in the carrier set G.

If the first UE is a PCUE in the carrier set G, and the prioritized synchronization reference source type of the first UE in the carrier set G is a GNSS, but the first UE doesn't detect reliable GNSS signals, in another implementation of this embodiment, the first UE detects SLSSs with an SLSSID=0 on a part of carriers in the carrier set G and the first UE belongs to a PCUE on the part of carriers. If an SLSS with an SLSSID=0 and with S-RSRP which meets the requirement can be detected, the first UE selects a second UE which transmits the SLSS as the synchronization reference source on all carriers in the carrier set G. Preferably, if the first UE can detect multiple SLSSs with an SLSSID=0 on one or more carriers, the first UE preferably selects an SLSS with the highest S-RSRP value; or a second UE with the highest S-RSRP is preferably selected from second UEs with high priority as the synchronization reference source on all carriers in the carrier set G, wherein the second UEs with high priority refer to second UEs which transmit a PSBCH with inCoverage field being set to TRUE, or second UEs which transmit an SLSS on a subframe which is indicated by a pre-configured parameter syncOffsetIndicator3. If the first UE doesn't detect an SLSS with an SLSSID=0 and with S-RSRP which meets the requirement on all carriers in the carrier set G, the first UE selects a PCell or a serving cell as the synchronization reference source on all carriers in the carrier set G.

If the first UE is a PCUE in the carrier set G, and the prioritized synchronization reference source type of the first UE in the carrier set G is a GNSS, but the first UE doesn't detect reliable GNSS signals, in still another implementation of this embodiment, the first UE detects SLSSs with an SLSSID=0 on a reference carrier in the carrier set G, and the first UE belongs to a PCUE on the reference carrier. Moreover, the priority of a service corresponding to the reference carrier is the highest when the first UE belongs to a PCUE on multiple carriers in the carrier set G. If an SLSS with an SLSSID=0 and with S-RSRP which meets the requirement can be detected, the first UE selects a second UE which transmits the SLSS as the synchronization reference source on all carriers in the carrier set G. Preferably, if the first UE can detect multiple SLSSs with an SLSSID=0 on one or more carriers, the first UE preferably selects an SLSS with the highest S-RSRP value; or a second UE with the highest S-RSRP is preferably selected from second UEs with high priority as the synchronization reference source on all carriers in the carrier set G, wherein the second UEs with high priority refer to second UEs which transmit a PSBCH with inCoverage field being set to TRUE, or second UEs which transmit an SLSS on a subframe which is indicated by a pre-configured parameter syncOffsetIndicator3. If the first UE doesn't detect an SLSS with an SLSSID=0 and with S-RSRP which meets the requirement on the reference carrier, the first UE selects a PCell or a serving cell as the synchronization reference source on all carriers in the carrier set G.

If the first UE is a PCUE in the carrier set G, and the prioritized synchronization reference source type of the UE in the carrier set G is a GNSS, but the first UE doesn't detect reliable GNSS signals, in yet another implementation of this embodiment, the first UE detects SLSSs with an SLSSID=0 on one or more carriers which meets at least one of the following conditions in the carrier set G.

1. The first UE detects PSCCHs and PSSCHs on the carriers.
2. The first UE performs channel sensing on the carriers.
3. PPPP levels of services corresponding to the carriers are 0.
4. PPPP levels of services corresponding to the carriers are 0 or 1.
5. Values of PPPPs of services corresponding to the carriers are less than a certain specific threshold, wherein the threshold can be defined by the standard, pre-configured or configured by a base station.
6. The carriers are carriers, indicated by a base station or by the pre-configuration signaling, which must receive PSCCHs and PSSCHs.
7. Services corresponding to the carriers need to be received by legacy UEs (i.e. V2X UEs of the 3GPP Rel-14).

If the first UE can detect an SLSS with an SLSSID=0 and with S-RSRP which meets the requirement, the first UE selects a second UE which transmits the SLSS as the synchronization reference source on all carriers in the carrier set G. Preferably, if the first UE can detect multiple SLSSs with an SLSSID=0 on one or more carriers, the first UE preferably selects an SLSS with the highest S-RSRP value; or a second UE with the highest S-RSRP is preferably selected from second UEs with high priority as the synchronization reference source on all carriers in the carrier set G, wherein the second UEs with high priority refer to second UEs which transmit a PSBCH with inCoverage field being set to TRUE, or second UEs which transmit an SLSS on a subframe which is indicated by a pre-configured parameter syncOffsetIndicator3. If the first UE doesn't detect an SLSS with an SLSSID=0 and with S-RSRP which meets the requirement on the part of carriers, the first UE selects a reference cell as the synchronization reference source on all carriers in the carrier set G. Or, the first UE further detects SLSSs with an SLSSID=0 on other carriers in the carrier set G. If an SLSS with S-RSRP which meets the requirement can be detected, the first UE selects a second UE which transmits the SLSS as the synchronization reference source on all carriers in the carrier set G; otherwise, the first UE selects a reference cell as the synchronization reference source on all carriers in the carrier set G, wherein the way in which the first UE selects the reference cell is the same as the way of Embodiment 1.

If the first UE has multiple aggregated carriers for sidelink communication currently, the multiple aggregated carriers form a set C, and the first UE uses a certain synchronization reference source Ry on a carrier Y in the set C as the synchronization reference source, then:

In accordance with one implementation of the present application, if the first UE meets the conditions of transmitting SLSSs and PSBCHs on the carrier Y, it is considered that the first UE meets the conditions of transmitting SLSSs and PSBCHs on all carriers in the carrier set C. If the Ry is a UE for transmitting SLSSs and PSBCHs, when the first UE transmits SLSSs and PSBCHs on a certain carrier Z in the carrier set C, the SLSS ID transmitted by the first UE on the carrier Z is SDz, wherein the SDz can be equal to SD which is determined by the first UE according to the SLSS ID and contents of PSBCHs transmitted by the Ry in a way defined in the existing standard (3GPP standard 36.331, Rel-e40). Preferably, in this case, the first UE considers that the value of the SLSS ID for SLSS transmission (i.e., the value of the SLSS ID contained in the configuration parameter set v2x-SyncConfig containing txParameters), which is configured on each carrier in the carrier set C, is the same; and the SDz can be equal to SD+$\Delta$, wherein $\Delta$ is the difference between the value of the SLSS ID for SLSS transmission, which is configured on the carrier Z, and the value of the SLSS ID for SLSS transmission, which is configured on the carrier Y. If the Ry is a UE for transmitting SLSSs and PSBCHs, the first UE sets the value of sl-Bandwidth in a PSBCH as the bandwidth of the carrier Z when determining contents of the PSBCH transmitted on the carrier Z. The syncInfoReserved can be set as the value of the field configured on the carrier Z.

In accordance with another implementation of the present application, for any one carrier K in the carrier set C, the first UE selects one synchronization reference source having the highest priority on the carrier K as a synchronization reference source Ssp for transmitting SLSSs and PSBCHs, and then the first UE determines, according to the measured S-RSRP for the Ssp to transmit signals, whether the conditions of transmitting SLSSs and PSBCHs are met on the carrier Z. If the Ssp is a UE for transmitting SLSSs and PSBCHs, when the first UE transmits SLSSs and PSBCHs on the carrier K, the method for the first UE to determine the SLSS ID transmitted on the carrier K according to the SLSS ID and contents of PSBCHs transmitted by the Ssp can be the same as that defined in the existing standard (3GPP standard 36.331, Rel-e40), and the method for the first UE to determine the contents of PBCHs transmitted on the carrier K according to the SLSS ID and contents of PSBCHs transmitted by the Ssp can be the same as that defined in the existing standard (3GPP standard 36.331, Rel-e40). It is to be clarified that the synchronization reference source for transmitting SLSSs and PSBCHs is different from the synchronization reference source for the UE on all carriers as defined in the step 102. The former is only used to determine whether SLSSs and PSBCHs are to be transmitted on the current carrier, and if it is necessary to transmit, the value of the SLSS ID and the contents of PSBCHs are determined, and it is not used to determine the timing for the UE to transmit PSSCHs and PSCCHs on all aggregated carriers.

Preferably, if the first UE has multiple aggregated carriers for sidelink communication currently and the UE meets the conditions of transmitting SLSSs and PSBCHs on one or more carriers, in accordance with one implementation of the present application, the first UE should transmit SLSSs and PSBCHs on resources for transmitting SLSSs and PSBCHs corresponding to all carriers which meet the conditions. If the number of carriers on which the first UE needs to transmit SLSSs and PSBCHs simultaneously exceeds the number of current available transmitting RF links for the first UE at a certain time point, or the first UE has no capability of transmitting sidelink signals simultaneously on multiple carriers, the UE should preferably ensure transmitting of SLSSs and PSBCHs on carriers corresponding to services with high priority and give up transmitting of SLSSs and PSBCHs on carriers corresponding to services with low priority. In accordance with another implementation of the present application, if the first UE meets the conditions of transmitting SLSSs and PSBCHs on one or more carriers, the first UE transmits SLSSs and PSBCHs only on carriers corresponding to service with PPPPs which are less than a certain specific threshold on the one or more carriers, wherein the specific threshold is defined by the standard, configured by a base station or pre-configured. In accordance with still another implementation of the present application, the first UE should transmit SLSSs and PSBCHs on resources for transmitting SLSSs and PSBCHs corresponding to all carriers which meet the conditions. If the number of carriers on which the first UE needs to transmit SLSSs and PSBCHs simultaneously exceeds the number of current available transmitting RF links for the UE at a certain time point, or the first UE has no capability of transmitting sidelink signals simultaneously on multiple carriers, the first UE should randomly select X carriers for transmitting SLSSs and PSBCHs, wherein X is the number of current carriers on which the first UE can transmit SLSSs and PSBCHs simultaneously. Preferably, if the carriers on which the first UE needs to transmit SLSSs and PSBCHs simultaneously contain the carrier where the synchronization reference source currently selected by the UE is located, the first UE must transmit SLSSs and PSBCHs on this carrier and then randomly select X−1 carriers for transmitting SLSSs and PSBCHs from other carriers on which SLSSs and PSBCHs are to be transmitted. In accordance with yet another implementation of the present application, the first UE transmits SLSSs and PSBCHs at least on carriers on which services to be received by legacy UEs (which refer to V2X UEs of the Rel-14) are located.

In accordance with the fifth implementation of the present application, the first UE should transmit SLSSs and PSBCHs on resources for transmitting SLSSs and PSBCHs corresponding to all carriers which meet the conditions. If the number of carriers on which the first UE needs to transmit SLSSs and PSBCHs simultaneously exceeds the number of current available transmitting RF links for the first UE at a certain time point, or the first UE has no capability of transmitting sidelink signals simultaneously on multiple carriers, the UE selects R carriers for transmitting SLSSs and PSBCHs from carriers which meet the conditions of transmitting SLSSs and PSBCHs. The value of R and the selected R carriers should meet the following conditions:

1. the value of R should not be greater than the number of the RF links for the first UE; and 2. the R carriers should at least include the carrier Cr, wherein, if the carrier where the synchronization reference source for the first UE is located meets the conditions of transmitting SLSSs and PSBCHs, the Cr is the carrier where the synchronization reference source for the first UE is located, or otherwise, the carrier Cr is a null set (that is, it does not represent any carrier); and 3. the first UE should support simultaneous transmission on the R carriers; and 4. the first UE should not support simultaneous transmission on any R+1 carriers, including the carrier Cr, in the carriers which meet the conditions of transmitting SLSSs and PSBCHs, or R+1 should be greater than the number of the RF links for the first UE.

If there are multiple combinations of carriers which meet the above conditions and R carriers contained in each combination are not completely the same, the first UE selects, based on its own implementation method, one combination of carriers as the carrier for transmitting SLSSs and PSBCHs, or randomly selects, from the multiple combinations of carriers which meet the above conditions, one combination of carriers for transmitting SLSSs and PSBCHs.

the first UE should transmit SLSSs and PSBCHs on resources for transmitting SLSSs and PSBCHs corresponding to all carriers which meet the conditions. If the number of carriers on which the first UE needs to transmit SLSSs and PSBCHs simultaneously exceeds the number of current available transmitting RF link for the first UE at a certain time point, or the first UE has no capability of transmitting sidelink signals simultaneously on multiple carriers, the first UE should preferably ensure transmitting of SLSSs and PSBCHs on carriers corresponding to services with high priority and give up transmitting SLSSs and PSBCHs on carriers corresponding to services with low priority. In another implementation of the present application, if the first UE meets the conditions of transmitting SLSSs and PSBCHs on one or more carriers, the first UE transmits SLSSs and PSBCHs only on carriers corresponding to service with PPPPs which are less than a certain specific threshold on the one or more carriers, wherein the specific threshold is defined by the standard, configured by a base station or pre-configured. In still another implementation of the present application, the first UE should transmit SLSSs and PSBCHs on resources for transmitting SLSSs and PSBCHs corresponding to all carriers which meet the conditions. If the number of carriers on which the first UE needs to transmit SLSSs and PSBCHs simultaneously exceeds the number of current available transmitting RF link for the first UE at a certain time point, or the first UE has no capability of transmitting sidelink signals simultaneously on multiple carriers, the first UE should randomly select X carriers for transmitting SLSSs and PSBCHs, where X is the number of current carriers on which the first UE can transmit SLSSs and PSBCHs simultaneously. In yet another implementation of the present application, the first UE transmits SLSSs and PSBCHs at least on carriers on which services to be received by legacy UEs (which refer to V2X UEs of the Rel-14) are located.

Embodiment 4

As another possible implementation of the present disclosure, on the basis of Embodiment 1, if the first UE is an OCUE in the carrier set G and the prioritized synchronization reference source type of the first UE in the carrier set G is an eNB, the first UE can detect SLSSs within all SLSSID ranges on all carriers in the carrier set G, or the first UE detects SLSSs within all SLSSID ranges on one or more carriers which meets at least one of the following conditions in the carrier set G.

1. The first UE detects PSCCHs and PSSCHs on the carriers.

2. The first UE performs channel sensing on the carriers.

3. PPPP levels of services corresponding to the carriers are 0.

4. PPPP levels of services corresponding to the carriers are 0 or 1.

5. Values of PPPPs of services corresponding to the carriers are less than a certain specific threshold, wherein the threshold can be defined by the standard, pre-configured or configured by a base station.

6. The carriers are carriers, indicated by a base station or by the pre-configuration signaling, which must receive PSCCHs and PSSCHs.

7. Services corresponding to the carriers need to be received by legacy UEs (i.e. V2X UEs of the 3GPP Rel-14).

If the first UE can detect one or more synchronization reference source UEs with power which meets the requirement on one or more carriers or detect reliable GNSS signals, the first UE selects a synchronization reference source as the synchronization reference source on all carriers in the carrier set G in a following order of priority (Priority 1 to Priority 6, from high priority to low priority).

Priority 1: A second UE which transmits an SLSS with an SLSSID belonging to a first set on one or more carriers detected by the first UE and in which the inCoverage field in a corresponding PSBCH is TRUE. Where the first set is a set of SLSSIDs for in coverage UE. If there are multiple second UEs which meet the above conditions, a second UE with the highest S-RSRP is considered as the highest priority; or a second UE with the highest S-RSRP on a carrier with the highest corresponding service priority is considered as the highest priority.

Priority 2: A second UE which transmits an SLSS with an SLSSID belonging to a first set on one or more carriers detected by the first UE and in which inCoverage field in a corresponding PSBCH is set to FALSE. Where the first set is a set of SLSSIDs for in coverage UE. If there are multiple second UEs which meet the above conditions, a second UE with the highest S-RSRP is considered as the highest priority; or a second UE with the highest S-RSRP on a carrier with the highest corresponding service priority is considered as the highest priority.

Priority 3: A GNSS.

Priority 4: A second UE which transmits an SLSS with an SLSSID=0 on one or more carriers detected by the first UE and in which the inCoverage field in a corresponding PSBCH is set to TRUE; or a second UE which transmits an SLSS with an SLSSID=0 on a subframe which is indicated by a pre-configured parameter syncOffsetIndicator3. If there are multiple second UEs which meet the above condition, a second UE with the highest S-RSRP is considered as the highest priority.

Priority 5: A second UE which transmits an SLSS with an SLSSID=0 on one or more carriers detected by the first UE and on a subframe which is indicated by a pre-configured parameter syncOffsetIndicator1 or syncOffsetIndicator2 and in which inCoverage field in a corresponding PSBCH is set to FALSE. If there are multiple second UEs which meet the above condition, a second UE with the highest S-RSRP is considered as the highest priority.

Priority 6: Other types of synchronization reference source UEs which transmit SLSSs on one or more carriers detected by the first UE. If there are multiple second UEs which meet the above conditions, a second UE with the highest S-RSRP is considered as the highest priority; or a second UE with the highest S-RSRP on a carrier with the highest corresponding service priority is considered as the highest priority.

If the first UE has multiple aggregated carriers for sidelink communication currently, the multiple aggregated carriers form a set C, and the first UE uses a certain synchronization reference source Ry on a carrier Y in the set C as the synchronization reference source, then:

In accordance with one implementation of the present application, if the first UE meets the conditions of transmitting SLSSs and PSBCHs on the carrier Y, it is considered that the first UE meets the conditions of transmitting SLSSs and PSBCHs on all carriers in the carrier set C. If the Ry is a UE for transmitting SLSSs and PSBCHs, when the first UE transmits SLSSs and PSBCHs on a certain carrier Z in the carrier set C, the SLSS ID transmitted by the first UE on the carrier Z is SDz, wherein the SDz can be equal to SD which is determined by the first UE according to the SLSS ID and contents of PSBCHs transmitted by the Ry in a way defined in the existing standard (3GPP standard 36.331, Rel-e40). Preferably, in this case, the first UE considers that the value of the SLSS ID for SLSS transmission (i.e., the value of the SLSS ID contained in the configuration parameter set v2x-SyncConfig containing txParameters), which is configured on each carrier in the carrier set C, is the same; and the SDz can be equal to SD+$\Delta$, wherein $\Delta$ is the difference between the value of the SLSS ID for SLSS transmission, which is configured on the carrier Z, and the value of the SLSS ID for SLSS transmission, which is configured on the carrier Y. If the Ry is a UE for transmitting SLSSs and PSBCHs, the first UE sets the value of sl-Bandwidth in a PSBCH as the bandwidth of the carrier Z when determining contents of the PSBCH transmitted on the carrier Z. The syncInfoReserved can be set as the value of the field configured on the carrier Z.

In accordance with another implementation of the present application, for any one carrier K in the carrier set C, the first UE selects one synchronization reference source having the highest priority on the carrier K as a synchronization reference source Ssp for transmitting SLSSs and PSBCHs, and then the first UE determines, according to the measured S-RSRP for the Ssp to transmit signals, whether the conditions of transmitting SLSSs and PSBCHs are met on the carrier Z. If the Ssp is a UE for transmitting SLSSs and PSBCHs, when the first UE transmits SLSSs and PSBCHs on the carrier K, the method for the first UE to determine the SLSS ID transmitted on the carrier K according to the SLSS ID and contents of PSBCHs transmitted by the Ssp can be the same as that defined in the existing standard (3GPP standard 36.331, Rel-e40), and the method for the first UE to determine the contents of PBCHs transmitted on the carrier K according to the SLSS ID and contents of PSBCHs transmitted by the Ssp can be the same as that defined in the existing standard (3GPP standard 36.331, Rel-e40). It is to be clarified that the synchronization reference source for transmitting SLSSs and PSBCHs is different from the synchronization reference source for the UE on all carriers as defined in the step 102. The former is only used to determine whether SLSSs and PSBCHs are to be transmitted on the current carrier, and if it is necessary to transmit, the value of the SLSS ID and the contents of PSBCHs are determined, and it is not used to determine the timing for the UE to transmit PSSCHs and PSCCHs on all aggregated carriers.

Preferably, if the first UE has multiple aggregated carriers for sidelink communication currently and the first UE meets the conditions of transmitting SLSSs and PSBCHs on one or more carriers, then:

In accordance with the first implementation of the present application, the first UE should transmit SLSSs and PSBCHs on resources for transmitting SLSSs and PSBCHs corresponding to all carriers which meet the conditions. If the number of carriers on which the first UE needs to transmit SLSSs and PSBCHs simultaneously exceeds the number of current available transmitting RF link for the first UE at a certain time point, or the first UE has no capability of transmitting sidelink signals simultaneously on multiple carriers, the first UE should preferably ensure transmitting of SLSSs and PSBCHs on carriers corresponding to services with high priority and give up transmitting SLSSs and PSBCHs on carriers corresponding to services with low priority.

In accordance with the second implementation of the present application, if the first UE meets the conditions of transmitting SLSSs and PSBCHs on one or more carriers, the first UE transmits SLSSs and PSBCHs only on carriers corresponding to service with PPPPs which are less than a certain specific threshold on the one or more carriers, wherein the specific threshold is defined by the standard, configured by a base station or pre-configured.

In accordance with the third implementation of the present application, the first UE should transmit SLSSs and PSBCHs on resources for transmitting SLSSs and PSBCHs corresponding to all carriers which meet the conditions. If the number of carriers on which the first UE needs to transmit SLSSs and PSBCHs simultaneously exceeds the number of current available transmitting RF link for the first UE at a certain time point, or the first UE has no capability of transmitting sidelink signals simultaneously on multiple carriers, the UE should randomly select X carriers for transmitting SLSSs and PSBCHs, where X is the number of current carriers on which the UE can transmit SLSSs and PSBCHs simultaneously. Preferably, if the carriers on which the first UE needs to transmit SLSSs and PSBCHs simultaneously contain the carrier where the synchronization reference source currently selected by the UE is located, the first UE must transmit SLSSs and PSBCHs on this carrier and then randomly select X−1 carriers for transmitting SLSSs and PSBCHs from other carriers on which SLSSs and PSBCHs are to be transmitted.

In accordance with the fourth implementation of the present application, the first UE transmits SLSSs and PSBCHs at least on carriers on which services to be received by legacy UEs (which refer to V2X UEs of the Rel-14) are located.

In accordance with the fifth implementation of the present application, the first UE should transmit SLSSs and PSBCHs on resources for transmitting SLSSs and PSBCHs corresponding to all carriers which meet the conditions. If the number of carriers on which the first UE needs to transmit SLSSs and PSBCHs simultaneously exceeds the number of current available transmitting RF links for the first UE at a certain time point, or the first UE has no capability of transmitting sidelink signals simultaneously on multiple carriers, the first UE selects R carriers for transmitting SLSSs and PSBCHs from carriers which meet the conditions of transmitting SLSSs and PSBCHs. The value of R and the selected R carriers should meet the following conditions:

1. the value of R should not be greater than the number of the RF links for the first UE; and 2. the R carriers should at least include the carrier Cr, wherein, if the carrier where the synchronization reference source for the first UE is located meets the conditions of transmitting SLSSs and PSBCHs, the Cr is the carrier where the synchronization reference source for the first UE is located, or otherwise, the carrier Cr is a null set (that is, it does not represent any carrier); and 3. the first UE should support simultaneous transmission on the R carriers; and 4. the first UE should not support simultaneous transmission on any R+1 carriers, including the carrier Cr, in the carriers which meet the conditions of transmitting SLSSs and PSBCHs, or R+1 should be greater than the number of the RF links for the first UE.

If there are multiple combinations of carriers which meet the above conditions and R carriers contained in each combination are not completely the same, the first UE selects, based on its own implementation method, one combination of carriers as the carrier for transmitting SLSSs and PSBCHs, or randomly selects, from the multiple combinations of carriers which meet the above conditions, one combination of carriers for transmitting SLSSs and PSBCHs.

Embodiment 5

As another possible implementation of the present disclosure, on the basis of Embodiment 1, if the first UE is an OCUE in the carrier set G and the prioritized synchronization reference source type of the first UE in the carrier set G is a GNSS, when the first UE doesn't detect reliable GNSS signals, the first UE can detect SLSSs within all SLSSID ranges on all carriers in the carrier set G, or the first UE detects SLSSs within all SLSSID ranges on one or more carriers which meets at least one of the following conditions in the carrier set G.

1. The first UE detects PSCCHs and PSSCHs on the carriers.
2. The first UE performs channel sensing on the carriers.
3. PPPP levels of services corresponding to the carriers are 0.
4. PPPP levels of services corresponding to the carriers are 0 or 1.
5. Values of PPPPs of services corresponding to the carriers are less than a certain specific threshold, wherein the threshold can be defined by the standard, pre-configured or configured by a base station.
6. The carriers are carriers, indicated by a base station or by the pre-configuration signaling, which must receive PSCCHs and PSSCHs.
7. Services corresponding to the carriers need to be received by legacy UEs (i.e. V2X UEs of the 3GPP Rel-14).

If the first UE can detect one or more synchronization reference source UEs with which meets the requirement on one or more carriers or detect reliable GNSS signals, the first UE selects a synchronization reference source as the synchronization reference source on all carriers in the carrier set G in a following order of priority (Priority 1 to Priority 4, from high priority to low priority).

Priority 1: A GNSS.

Priority 2: A second UE which transmits an SLSS with an SLSSID belonging to a first set on one or more carriers detected by the first UE and in which inCoverage field in a corresponding PSBCH is set to TRUE, where the first set is a set of SLSSIDs for in coverage UE; or a second UE which transmits an SLSS with an SLSSID=0 on one or more carriers detected by the first UE and in which inCoverage field in a corresponding PSBCH is set to TRUE; or a second UE which transmits an SLSS with an SLSSID=0 on one or more carriers detected by the first UE and on a subframe which is indicated by a pre-configured parameter syncOffsetIndicator3. If there are multiple second UEs which meet the above conditions, a second UE with the highest S-RSRP is considered as the highest priority; or a second UE with the highest S-RSRP on a carrier with the highest corresponding service priority is considered as the highest priority.

Priority 3: A second UE which transmits an SLSS with an SLSSID belonging to a first set on one or more carriers detected by the first UE and in which inCoverage field in a corresponding PSBCH is set to FALSE; or a second UE which transmits an SLSS with an SLSSID=0 on one or more carriers detected by the first UE and on a subframe which is indicated by a pre-configured parameter syncOffsetIndicator1 or syncOffsetIndicator2 and in which inCoverage field in a corresponding PSBCH is set to FALSE; or a second UE which transmits an SLSS with an SLSSID=169 on one or more carriers detected by the first UE and in which inCoverage field in a corresponding PSBCH is set to FALSE. If there are multiple UEs which meet the above conditions, a UE with the highest S-RSRP is considered as the highest priority; or a second UE with the highest S-RSRP on a carrier with the highest corresponding service priority is considered as the highest priority.

Priority 4: Other types of synchronization reference source second UEs which transmit SLSSs on one or more carriers detected by the first UE. If there are multiple second UEs which meet the above conditions, a second UE with the highest S-RSRP is considered as the highest priority; or a second UE with the highest S-RSRP on a carrier with the highest corresponding service priority is considered as the highest priority.

If the first UE has multiple aggregated carriers for sidelink communication currently, the multiple aggregated carriers form a set C, and the first UE uses a certain synchronization reference source Ry on a carrier Y in the set C as the synchronization reference source, then:

In accordance with one implementation of the present application, if the first UE meets the conditions of transmitting SLSSs and PSBCHs on the carrier Y, it is considered that the first UE meets the conditions of transmitting SLSSs and PSBCHs on all carriers in the carrier set C. If the Ry is a UE for transmitting SLSSs and PSBCHs, when the first UE transmits SLSSs and PSBCHs on a certain carrier Z in the carrier set C, the SLSS ID transmitted by the first UE on the carrier Z is SDz, wherein the SDz can be equal to SD which is determined by the first UE according to the SLSS ID and contents of PSBCHs transmitted by the Ry in a way defined in the existing standard (3GPP standard 36.331, Rel-e40). Preferably, in this case, the first UE considers that the value of the SLSS ID for SLSS transmission (i.e., the value of the SLSS ID contained in the configuration parameter set v2x-SyncConfig containing txParameters), which is configured on each carrier in the carrier set C, is the same; and the SDz can be equal to SD+Δ, wherein Δ is the difference between the value of the SLSS ID for SLSS transmission, which is configured on the carrier Z, and the value of the SLSS ID for SLSS transmission, which is configured on the carrier Y. If the Ry is a UE for transmitting SLSSs and PSBCHs, the first UE sets the value of sl-Bandwidth in a PSBCH as the bandwidth of the carrier Z when determining contents of the PSBCH transmitted on the carrier Z. The syncInfoReserved can be set as the value of the field configured on the carrier Z.

In accordance with another implementation of the present application, if the Ry is a UE for transmitting SLSSs and PSBCHs, the first UE considers that the conditions of transmitting SLSSs and PSBCHs are met on all carriers other than the carrier Y in the set C. When the first UE transmits SLSSs and PSBCHs on a certain carrier Z in the carrier set C, the SLSS ID transmitted by the first UE on the carrier Z is SDz, wherein the SDz can be equal to SD which is determined by the first UE according to the SLSS ID and contents of PSBCHs transmitted by the Ry in a way defined in the existing standard (3GPP standard 36.331, Rel-e40). Preferably, in this case, the first UE considers that the value of the SLSS ID for SLSS transmission (i.e., the value of the SLSS ID contained in the configuration parameter set v2x-SyncConfig containing txParameters), which is configured on each carrier in the carrier set C, is the same; and the SDz can be equal to SD+Δ, wherein Δ is the difference between the value of the SLSS ID for SLSS transmission, which is configured on the carrier Z, and the value of the SLSS ID for SLSS transmission, which is configured on the carrier Y. If the Ry is a UE for transmitting SLSSs and PSBCHs, the first UE sets the value of sl-Bandwidth in a PSBCH as the bandwidth of the carrier Z when determining contents of the PSBCH transmitted on the carrier Z. The syncInfoReserved can be set as the value of the field configured on the carrier Z.

In accordance with still another implementation of the present application, for any one carrier K in the carrier set C, the first UE selects one synchronization reference source having the highest priority on the carrier K as a synchronization reference source Ssp for transmitting SLSSs and PSBCHs, and then the first UE determines, according to the measured S-RSRP for the Ssp to transmit signals, whether the conditions of transmitting SLSSs and PSBCHs are met on the carrier Z. If the Ssp is a UE for transmitting SLSSs and PSBCHs, when the first UE transmits SLSSs and PSBCHs on the carrier K, the method for the first UE to determine the SLSS ID transmitted on the carrier K according to the SLSS ID and contents of PSBCHs transmitted by the Ssp can be the same as that defined in the existing standard (3GPP standard 36.331, Rel-e40), and the method for the first UE to determine the contents of PBCHs transmitted on the carrier K according to the SLSS ID and contents of PSBCHs transmitted by the Ssp can be the same as that defined in the existing standard (3GPP standard 36.331, Rel-e40). It is to be clarified that the synchronization reference source for transmitting SLSSs and PSBCHs is different from the synchronization reference source for the UE on all carriers as defined in the step 102. The former is only used to determine whether SLSSs and PSBCHs are to be transmitted on the current carrier, and if it is necessary to transmit, the value of the SLSS ID and the contents of PSBCHs are determined, and it is not used to determine the timing for the UE to transmit PSSCHs and PSCCHs on all aggregated carriers.

Preferably, if the first UE has multiple aggregated carriers for sidelink communication currently and the first UE meets the conditions of transmitting SLSSs and PSBCHs on one or more carriers, then:

In accordance with the first implementation of the present application, the first UE should transmit SLSSs and PSBCHs on resources for transmitting SLSSs and PSBCHs corresponding to all carriers which meet the conditions. If the number of carriers on which the first UE needs to transmit SLSSs and PSBCHs simultaneously exceeds the number of current available transmitting RF link for the first UE at a certain time point, or the first UE has no capability of transmitting sidelink signals simultaneously on multiple carriers, the first UE should preferably ensure transmitting of SLSSs and PSBCHs on carriers corresponding to services with high priority and give up transmitting SLSSs and PSBCHs on carriers corresponding to services with low priority.

In accordance with the second implementation of the present application, if the first UE meets the conditions of transmitting SLSSs and PSBCHs on one or more carriers, the first UE transmits SLSSs and PSBCHs only on carriers corresponding to service with PPPPs which are less than a certain specific threshold on the one or more carriers, wherein the specific threshold is defined by the standard, configured by a base station or pre-configured.

In accordance with the third another implementation of the present application, the first UE should transmit SLSSs and PSBCHs on resources for transmitting SLSSs and PSBCHs corresponding to all carriers which meet the conditions. If the number of carriers on which the first UE needs to transmit SLSSs and PSBCHs simultaneously exceeds the number of current available transmitting RF link for the first UE at a certain time point, or the first UE has no capability of transmitting sidelink signals simultaneously on multiple carriers, the first UE should randomly select X carriers for transmitting SLSSs and PSBCHs, where X is the number of current carriers on which the first UE can transmit SLSSs and PSBCHs simultaneously. In yet another implementation of the present application, the first UE transmits SLSSs and PSBCHs at least on carriers on which services to be received by legacy UEs (which refer to V2X UEs of the Rel-14) are located. Preferably, if the carriers on which the first UE needs to transmit SLSSs and PSBCHs simultaneously contain the carrier where the synchronization reference source currently selected by the UE is located, the first UE must transmit SLSSs and PSBCHs on this carrier and then randomly select X−1 carriers for transmitting SLSSs and PSBCHs from other carriers on which SLSSs and PSBCHs are to be transmitted.

In accordance with the fourth implementation of the present application, the first UE transmits SLSSs and PSBCHs at least on carriers on which services to be received by legacy UEs (which refer to V2X UEs of the Rel-14) are located.

In accordance with the fifth implementation of the present application, the first UE should transmit SLSSs and PSBCHs on resources for transmitting SLSSs and PSBCHs corresponding to all carriers which meet the conditions. If the number of carriers on which the first UE needs to transmit SLSSs and PSBCHs simultaneously exceeds the number of current available transmitting RF links for the first UE at a certain time point, or the first UE has no capability of transmitting sidelink signals simultaneously on multiple carriers, the UE selects R carriers for transmitting SLSSs and PSBCHs from carriers which meet the conditions of transmitting SLSSs and PSBCHs. The value of R and the selected R carriers should meet the following conditions:

1. the value of R should not be greater than the number of the RF links for the first UE; and 2. the R carriers should at least include the carrier Cr, wherein, if the carrier where the synchronization reference source for the first UE is located meets the conditions of transmitting SLSSs and PSBCHs, the Cr is the carrier where the synchronization reference source for the first UE is located, or otherwise, the carrier Cr is a null set (that is, it does not represent any carrier); and 3. the first UE should support simultaneous transmission on the R carriers; and 4. the first UE should not support simultaneous transmission on any R+1 carriers, including the carrier Cr, in the carriers which meet the conditions of transmitting SLSSs and PSBCHs, or R+1 should be greater than the number of the RF links for the first UE.

If there are multiple combinations of carriers which meet the above conditions and R carriers contained in each combination are not completely the same, the first UE selects, based on its own implementation method, one combination of carriers as the carrier for transmitting SLSSs and PSBCHs, or randomly selects, from the multiple combinations of carriers which meet the above conditions, one combination of carriers for transmitting SLSSs and PSBCHs.

Embodiment 6

As another possible implementation of the present disclosure, in this embodiment, the first UE selects a reference carrier from the carrier set G first. In the implementation 1 of this embodiment, the reference carrier is a carrier with the highest corresponding service priority in the carrier set G. In the implementation 2 of this embodiment, if the first UE belongs to an ICUE and/or a PCUE on one or more carriers in the carrier set G, the reference carrier is a carrier with the highest corresponding service priority in the one or more carriers; otherwise, the reference carrier is a carrier with the highest corresponding service priority in the carrier set G.

The first UE selects a synchronization reference source on the reference carrier according to the above mentioned technical way which has already been disclosed, and uses the selected synchronization reference source as the synchronization reference source on all carriers in the carrier set G.

Figure 2:
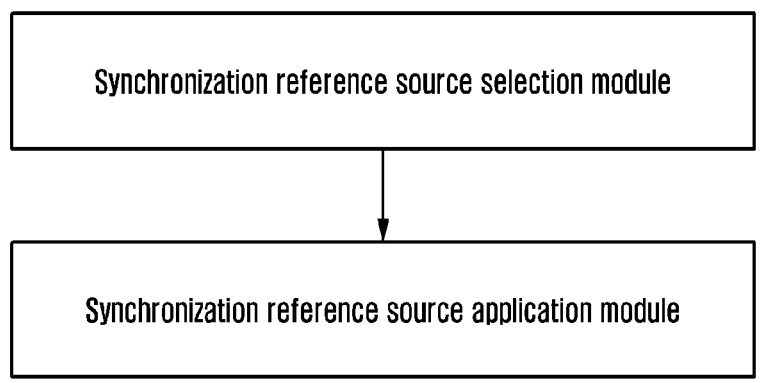
FIG. 2 is a block diagram of modules of an equipment for selecting a synchronization reference source for multi-carrier sidelink communication according to the present invention.

Referring to FIG. 2, an equipment for selecting a synchronization reference source for multi-carrier sidelink communication according to the present disclosure includes:

a synchronization reference source selection module, configured to select a synchronization reference source according to a status of a User Equipment (UE) on multiple carriers; and a synchronization reference source application module, configured to use the selected synchronization reference source as a synchronization reference source for the UE on all carriers.

Preferably, the step of selecting a synchronization reference source according to the status of a UE on multiple carriers includes:

determining a cell coverage attribute of the UE on all carriers according to the cell coverage status of the UE on multiple carriers; and selecting, according to a cell coverage attribute of the UE on all carriers, a synchronization reference source.

Preferably, the step of determining a cell coverage attribute of the UE on all carriers according to the cell coverage status of the UE on multiple carriers includes:

determining the cell coverage attribute of the UE on all carriers as ICUE, if there is a carrier on which the UE is in coverage of a cell among multiple carriers;

determining the cell coverage attribute of the UE on all carriers as PCUE, if the UE is out of coverage on all carriers and an available carries list for vehicle to vehicle/pedestrian/infrastructure/network communication included in a system message or an RRC reconfiguration message received by the UE contains at least one of all carriers;

or otherwise, determining the cell coverage attribute of the UE on all carriers as OCUE.

Preferably, the step of selecting a synchronization reference source according to a cell coverage attribute of the UE on all carriers includes:

determining a prioritized synchronization reference source type of the UE on all carriers according to the cell coverage attribute of the UE on all carriers;

determining priority order for a UE to select a synchronization reference source according to the cell coverage attribute of the UE on all carriers and the prioritized synchronization reference source type of the UE on all carriers or according to the cell coverage attribute of the UE on all carriers, the prioritized synchronization reference source type of the UE on all carriers and the power of synchronization reference source signal; and selecting a synchronization reference source according to the priority order.

Preferably, the step of determining a prioritized synchronization reference source type of the UE on all carriers according to the cell coverage attribute of the UE on all carriers includes:

determining that the prioritized synchronization reference source type of the UE on all carriers is the same as a carrier X, if the cell coverage attribute of the UE on all carriers is ICUE, where the cell coverage attribute of the UE on the carrier X is ICUE;

determining that the prioritized synchronization reference source type of the UE on all carriers is the same as a carrier Y, if the cell coverage attribute of the UE on all carriers is PCUE, where the cell coverage attribute of the UE on the carrier Y is PCUE, and the priority of the carrier Y is the highest, wherein the priority of Y is indicated by higher layer, or the index value of the carrier Y is the lowest; and determining that the prioritized synchronization reference source type of the UE on all carriers is the same as a carrier Z, if the cell coverage attribute of the UE on all carriers is OCUE, where the priority of the carrier Z is the highest, wherein the priority of Z is indicated by higher layer, or the index value of the carrier Z is the lowest.

Preferably, the step of determining priority order for a UE to select a synchronization reference source according to the cell coverage attribute of the UE on all carriers and the prioritized synchronization reference source type of the UE on all carriers includes: grouping all carriers into a carrier set G;

determining priority order for a first UE to select a synchronization reference source as follows: from high priority to low priority, a primary carrier on which the cell coverage status of the first UE is ICUE in the carrier set G, a secondary carrier on which the cell coverage status of the first UE is ICUE in the carrier set G, and other carriers on which the cell coverage status of the first UE is ICUE in the carrier set G, if the cell coverage attribute of the first UE is ICUE and the prioritized synchronization reference source type of the first UE is a base station in the carrier set G; or determining priority order for a first UE to select a synchronization reference source as follows: from high priority to low priority, a GNSS, a second UE which transmits a SLSS with SLSSID=0 on a carrier in the carrier set G, and a base station, if the cell coverage attribute of the first UE is ICUE and the prioritized synchronization reference source type of the first UE is a GNSS in the carrier set G; or determining priority order for a first UE to select a synchronization reference source as follows: from high priority to low priority, a GNSS, a second UE which transmits an SLSS with an SLSSID=0 on a carrier in the carrier set G, and a base station, if the cell coverage attribute of the first UE is PCUE and the prioritized synchronization reference source type of the first UE is a GNSS in the carrier set G; or determining priority order for a first UE to select a synchronization reference source as follows: from high priority to low priority, a second UE which transmits an SLSS with an SLSSID belonging to a first set on a carrier in the carrier set G, a GNSS, a second UE which transmits an SLSS with an SLSSID=0 on a carrier in the carrier set G, and other second UEs which transmit SLSSs on a carrier in the carrier set G, if the cell coverage attribute of the first UE is OCUE and the prioritized synchronization reference source type of the first UE is a base station in the carrier set G;

determining priority order for a first UE to select a synchronization reference source as follows: from high priority to low priority, a GNSS, a second UE which transmits a PSBCH on a carrier in the carrier set G and a coverage status indication field inCoverage of the PSBCH is set to TRUE, or a second UE which transmits an SLSS on a carrier in the carrier set G and on a subframe which is indicated by a pre-configured parameter syncOffsetIndicator3, a second UE which transmits a PSBCH in the carrier set G and a coverage status indication field inCoverage of the PSBCH is set to FALSE, and other second UEs which transmit SLSSs on a carrier in the carrier set G, if the cell coverage attribute of the first UE is OCUE and the prioritized synchronization reference source type of the first UE is a GNSS in the carrier set G; and the first set is a set of SLSSIDs for in coverage UE.

Preferably, the step of determining priority order for a UE to select a synchronization reference source according to the cell coverage attribute of the UE on all carriers and the prioritized synchronization reference source type of the UE on all carriers includes: grouping all carriers into a carrier set G, and determining priority order for a first UE to select a synchronization reference source as follows, if the cell coverage attribute of the first UE is ICUE and the prioritized synchronization reference source type of the first UE is a GNSS in the carrier set G: from high priority to low priority, a GNSS;

a second UE which transmits an SLSS with an SLSSID=0 on a carrier in the carrier set G, or a second UE which transmits an SLSS with an SLSSID=0 on a carrier A in the carrier set G, where the cell coverage attribute of the first UE on the carrier A is ICUE or PCUE, or a second UE which transmits an SLSS with an SLSSID=0 on a carrier A in the carrier set G, where the cell coverage attribute of the first UE on the carriers A is ICUE or PCUE and the priority of the carrier A indicated by higher layer is the highest;

a reference cell.

Preferably, the step of determining priority order for a UE to select a synchronization reference source according to the cell coverage attribute of the UE on all carriers and the prioritized synchronization reference source type of the UE on all carriers includes: grouping all carriers into a carrier set G, and determining priority order for a first UE to select a synchronization reference source as follows, if the cell coverage attribute of the first UE is PCUE and the prioritized synchronization reference source type of the first UE is a GNSS in the carrier set G: from high priority to low priority, a GNSS;

a second UE which transmits an SLSS with an SLSSID=0 on a carrier in the carrier set G, or a second UE which transmits an SLSS with an SLSSID=0 on a carrier A in the carrier set G, wherein the cell coverage attribute of the first UE on the carrier A is PCUE, or a second UE which transmits an SLSS with an SLSSID=0 on a carrier A in the carrier set G, wherein the cell coverage attribute of the first UE on the carrier A is PCUE and the priority of the carrier A indicated by higher layer is the highest;

a reference cell.

Preferably, the step of determining priority order for a UE to select a synchronization reference source according to the cell coverage attribute of the UE on all carriers and the prioritized synchronization reference source type of the UE on all carriers includes: grouping all carriers into a carrier set G, and determining priority order for a first UE to select a synchronization reference source as follows, if the cell coverage attribute of the first UE is OCUE and the prioritized synchronization reference source type of the first UE is a base station in the carrier set G: from high priority to low priority, a second UE which transmits an SLSS with an SLSSID belonging to a first set on a carrier A in the carrier set G and transmits a PSBCH with inCoverage field being set to TRUE on the carrier A;

a second UE which transmits an SLSS with an SLSSID belonging to a first set on a carrier A in the set of carrier G and transmits a PSBCH with inCoverage field being set to FALSE on the carrier A;

a GNSS;

a second UE which transmits an SLSS with an SLSSID=0 on a carrier A in the carrier set G and transmits a PSBCH with inCoverage field being set to TRUE on the carrier A, or a second UE which transmits an SLSS with an SLSSID=0 on the carrier A in the carrier set G and on a subframe which is indicated by a pre-configured parameter syncOffsetIndicator3;

a second UE which transmits an SLSS with an SLSSID=0 on a carrier A in the carrier set G and on a subframe which is indicated by a pre-configured parameter syncOffsetIndicator1 or syncOffsetIndicator2 and transmits a PSBCH with inCoverage field being set to FALSE on the carrier A;

other second UEs which transmit SLSSs on a carrier in the carrier set G;

the first set is a set of SLSSIDs for in coverage UE.

Preferably, the step of determining priority order for a UE to select a synchronization reference source according to the cell coverage attribute of the UE on all carriers and the prioritized synchronization reference source type of the UE on all carriers includes: grouping all carriers into a carrier set G, and determining priority order for a first UE to select a synchronization reference source as follows, if the cell coverage attribute of the first UE is OCUE and the prioritized synchronization reference source type of the first UE is a GNSS in the carrier set G: from high priority to low priority, a GNSS;

a second UE which transmits an SLSS with an SLSSID belonging to a first set or an SLSSID=0 on a carrier A in the carrier set G and transmits a PSBCH with inCoverage field being set to TRUE on the carrier A, or a second UE which transmits an SLSS with an SLSSID=0 on the carrier A in the carrier set G and on a subframe which is indicated by a pre-configured parameter syncOffsetIndicator3;

a second UE which transmits an SLSS with an SLSSID belonging to a first set on a carrier A in the carrier set G and transmits a PSBCH with inCoverage field being set to FALSE on the carrier A; a second UE which transmits an SLSS with an SLSSID=0 on a carrier A in the carrier set G and on a subframe which is indicated by a pre-configured parameter syncOffsetIndicator1 or syncOffsetIndicator2 and transmits a PSBCH with inCoverage field being set to FALSE on the carrier A, or a second UE which transmits an SLSS with an SLSSID=169 on a carrier A in the carrier set G and transmits a PSBCH with inCoverage field being set to FALSE on the carrier A;

other second UEs which transmit SLSSs on a carrier in the carrier set G;

the first set is a set of SLSSIDs for in coverage UE.

Preferably, the step of selecting a synchronization reference source according to a cell coverage attribute of the UE on all carriers includes: detecting SLSSs within all SLSSID ranges on all carriers, or detecting SLSSs within all SLSSID ranges only on a carrier with the highest corresponding service priority or the lowest index, and selecting a synchronization reference source according to the cell coverage attribute of the UE on all carriers, wherein the priority of a service corresponding to a carrier is indicated by higher layer.

Preferably, the step of selecting a synchronization reference source according to the priority order includes: arranging, according to the priority order, the detected signals from high priority to low priority, if more than two second UEs which meet conditions are detected at the highest priority of the arrangement result, a second UE corresponding to an SLSS with the highest S-RSRP value is selected, or a second UE with the highest S-RSRP value is selected from second UEs with high priority as a synchronization reference source of a first UE, wherein the second UEs with high priority include: second UEs which transmit a PSBCH with inCoverage field being set to TRUE on a corresponding carrier, and second UEs which transmit an SLSS on a corresponding carrier and on a subframe which is indicated by a pre-configured parameter syncOffsetIndicator3.

Preferably, the step of selecting a synchronization reference source according to the priority order includes: arranging, according to the priority order, the detected signals from high priority to low priority, if more than two second UEs which meet conditions are detected at the highest priority of the arrangement result, a second UE with the highest S-RSRP is selected, or a second UE with the highest S-RSRP on a carrier with the highest corresponding service priority is selected as a synchronization reference source of a first UE, wherein the priority of a service corresponding to a carrier is indicated by a higher layer.

Known from the above detailed description of the present disclosure, compared with the prior art, the present disclosure has at least the following beneficial technical effects: a best synchronization reference source is selected, according to the status of a UE on multiple carriers, as a unified synchronization reference source on multiple carriers, and the influence caused by the in-band interference and the half-duplex constraint is significantly reduced; meanwhile, the interference of cellular communication from sidelink communication is avoided, and the data transmission rate and the system capacity of a sidelink communication system are effectively increased.

Embodiment 7

Since a legacy UE can only identify a resource reservation interval not less than 20, if a new UE sets the resource reservation interval as a value less than 20, for example, 10, the resource reservation effect cannot be realized when the new UE and the legacy UE work in a same resource pool.

In order to solve this problem, a method for setting SCI 1 is provided in this embodiment. A physical layer of a transmitting UE sets a value of each related field in the SCI 1 according to the value of the resource reservation interval and the value of the time gap between initial transmission and retransmission in a sidelink grant configured by a higher layer (an MAC layer). Preferably, if the value of the resource reservation interval in the sidelink grant configured by the higher layer is not less than 20, the method for setting, by the UE, a resource reservation field and a time gap between initial transmission and retransmission field in the SCI 1 is the same as the method defined in 3GPP standard 36.213 V14.3.0.

If the value of the resource reservation interval in the sidelink grant configured by the higher layer is 10, in one implementation of this embodiment, the transmitting UE sets fours bits of the resource reservation field in the SCI1 as 1100 (that is, the value of the corresponding resource reservation interval is 20), and sets four bits of the time gap between initial transmission and retransmission field as 1010 (that is, the value of the corresponding time gap is 10). In addition, a first bit, a second bit, a third bit and a fourth bit among reserved bits are set as the value of the time gap between initial transmission and retransmission in the sidelink grant configured by the higher layer, and a fifth bit among the reserved bits is set as 1 in order to indicate that the current resource reservation interval is 10, wherein the first bit, the second bit, the third bit, the fourth bit and the fifth bit are certain five idle bits among the reserved bits in the SCI 1. Preferably, in this way, the time gap between initial transmission and retransmission k should satisfy the following condition: $-9 \leq k \leq 9$. For a receiving UE, the location of resources for transmitting PSSCHs and the location of reserved PSSCH resources for the UE transmitting the SCI 1 should be determined according to the received values of the resource reservation field and the time gap between initial transmission and retransmission field in the SCI 1, the values of the first bit, the second bit, the third bit, the fourth bit and the fifth bit among the reserved bits and the corresponding meanings.

If the value of the resource reservation interval in the sidelink grant configured by the higher layer is 10, in another implementation of this embodiment, the transmitting UE sets four bits of the resource reservation field in the SCI 1 as 1100 (that is, the value of the corresponding resource reservation interval is 20), and sets four bits of the time gap between initial transmission and retransmission field as 1010 (that is, the value of the corresponding time gap is 10). In addition, a first bit, a second bit and a third bit among reserved bits are set as the value of the time gap between initial transmission and retransmission in the sidelink grant configured by the higher layer, and a fourth bit among the reserved bits is set as 1 in order to indicate that the current resource reservation interval is 10, wherein the first bit, the second bit, the third bit and the fourth bit are certain four idle bits among the reserved bits in the SCI 1. Preferably, in this way, the time gap between initial transmission and retransmission k should satisfy the following condition: $-7 \leq k \leq 7$ or $-8 \leq k \leq 8$. For a receiving UE, the position for transmitting PSSCHs and the position for transmitting reserved PSSCH resources in the UE for transmitting the SCI 1 should be determined according to the received values of the resource reservation field and the time gap between initial transmission and retransmission field in the SCI 1, the values of the first bit, the second bit, the third bit and the fourth bit among the reserved bits and the corresponding meanings.

By the method, a next reservation can be indicated by the time gap between initial transmission and retransmission field in the SCI 1, and the time gap between initial transmission and retransmission is indicated by four additional bits among reserved bits, so that a legacy UE can be prevented from occupying resources reserved by a new UE at a time interval less than 20. In addition, a fifth bit among the reserved bits can indicate the real time gap between initial transmission and retransmission of the new UE, so that it is ensured that the new UE can correctly receive and measure PSSCHs transmitted by the transmitting UE.

Known from the above detailed description of the present disclosure, compared with the prior art, the present disclosure has at least the following beneficial technical effects: a best synchronization reference source is selected, according to the status of a UE on multiple carriers, as a unified synchronization reference source on multiple carriers, and the influence caused by the in-band interference and the half-duplex constraint is significantly reduced; meanwhile, the interference of cellular communication from sidelink communication is avoided, and the data transmission rate and the system capacity of a sidelink communication system are effectively increased.

It should be understood by those skilled in the art that the present disclosure involves devices for carrying out one or more of operations as described in the present invention. Those devices can be specially designed and manufactured as intended, or can comprise well known devices in a general-purpose computer. Those devices have computer programs stored therein, which are selectively activated or reconstructed. Such computer programs can be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. In other words, the readable media comprise any media storing or transmitting information in a device (for example, computer) readable form.

It should be understood by those skilled in the art that computer program instructions can be used to realize each block in structure diagrams and/or block diagrams and/or flowcharts as well as a combination of blocks in the structure diagrams and/or block diagrams and/or flowcharts. It should be understood by those skilled in the art that these computer program instructions can be provided to general purpose computers, special purpose computers or other processors of programmable data processing means to be implemented, so that solutions designated in a block or blocks of the structure diagrams and/or block diagrams and/or flow diagrams disclosed by the present disclosure are executed by computers or other processors of programmable data processing means.

It should be understood by those skilled in the art that the steps, measures and solutions in the operations, methods and flows already discussed in the present disclosure may be alternated, changed, combined or deleted. Further, other steps, measures and solutions in the operations, methods and flows already discussed in the present disclosure can also be alternated, changed, rearranged, decomposed, combined or deleted. Further, the steps, measures and solutions of the prior art in the operations, methods and operations disclosed in the present disclosure can also be alternated, changed, rearranged, decomposed, combined or deleted.

The foregoing descriptions are merely some implementations of the present disclosure. It should be noted that, to a person of ordinary skill in the art, various improvements and modifications can be made without departing from the principle of the present disclosure, and these improvements and modifications shall be regarded as falling into the protection scope of the present disclosure.

The invention claimed is:

1. A method for transmitting a synchronization information for multi-carrier sidelink communication in a first user equipment (UE), the method comprising:
  receiving, from a second UE, a sidelink synchronization signal (SLSS) and a physical sidelink broadcast channel (PSBCH) on a first carrier;
  selecting the second UE as a synchronization reference source according to a status of the first UE on multiple carriers, wherein the status of the first UE is at least one of an in coverage state, an out of coverage state, and a partial coverage state;
  setting a value of a bandwidth parameter of the PSBCH to be transmitted on a second carrier; and
  transmitting the SLSS and the PSBCH on the second carrier according to the selected the synchronization reference source and the set value of the bandwidth parameter,
  wherein the first carrier and the second carrier are different carriers from each other.

2. The method of claim 1, wherein a reserved bit field of the PSBCH is set as a value of a field configuration on the second carrier.

3. The method of claim 1, further comprising:
  selecting an identifier (ID) of the SLSS to be transmitted on the second carrier to be the same as an SLSS ID received on the first carrier.

4. The method of claim 1, wherein the status of the first UE is one of:
  the first UE is in coverage of a cell on a current carrier on which sidelink communication is performed,
  the first UE is out of coverage on the current carrier on which sidelink communication is performed, or
  the current carrier on which the first UE performed sidelink communication is contained in v2x-Inter-FreqInfoList in a system message 21 or an RRC reconfiguration message transmitted by a serving cell or a primary cell.

5. The method of claim 1, wherein selecting a synchronization reference source according to the status of the first UE on multiple carriers comprises:
  determining a priority order of synchronization reference sources according to the status of the first UE on multiple carriers; and
  selecting a synchronization reference source according to the determined priority order.

6. The method of claim 5, wherein determining the priority order of synchronization reference sources according to the status of the first UE on multiple carriers comprises:
  determining a cell coverage attribute of the first UE on all carriers according to the status of the first UE on multiple carriers;
  determining a prioritized synchronization reference source type of the first UE on all carriers according to the cell coverage attribute of the first UE on all carriers; and
  determining the priority order for the first UE to select a synchronization reference source according to the cell coverage attribute of the first UE on all carriers and the prioritized synchronization reference source type of the first UE on all carriers or according to the cell coverage attribute of the first UE on all carriers, the prioritized synchronization reference source type of the first UE on all carriers and a power of a synchronization reference source signal.

7. The method of claim 6, wherein determining a prioritized synchronization reference source type of the first UE on all carriers according to the cell coverage attribute of the first UE on all carriers comprises:
  determining that the prioritized synchronization reference source type of the first UE on all carriers is the same as a carrier X, if the cell coverage attribute of the first UE on all carriers is in coverage user equipment (ICUE), wherein the cell coverage attribute of the UE on the carrier X is ICUE;

determining that the prioritized synchronization reference source type of the first UE on all carriers is the same as a carrier Y, when the cell coverage attribute of the first UE on all carriers is partial coverage user equipment (PCUE), wherein the cell coverage attribute of the first UE on the carrier Y is PCUE, and a priority of the carrier Y is highest, wherein the priority of the carrier Y is indicated by a higher layer, or an index value of the carrier Y is lowest; and determining that the prioritized synchronization reference source type of the first UE on all carriers is the same as a carrier Z, if the cell coverage attribute of the first UE on all carriers is out of coverage user equipment (OCUE), wherein a priority of the carrier Z is highest, wherein the priority of the carrier Z is indicated by a higher layer, or an index value of the carrier Z is lowest.

8. The method of claim 6, wherein determining the priority order for the first UE to select the synchronization reference source according to the cell coverage attribute of the first UE on all carriers and the prioritized synchronization reference source type of the first UE on all carriers comprises:

grouping all carriers into a carrier set G;

in a case where the cell coverage attribute of the first UE is ICUE and the prioritized synchronization reference source type of the first UE is a base station in the carrier set G, determining a priority order for the first UE to select the synchronization reference source, from high priority to low priority according to the following hierarchy:

a primary carrier on which cell coverage status of the first UE is ICUE in the carrier set G, a secondary carrier on which the cell coverage status of the first UE is ICUE in the carrier set G, and other carriers on which the cell coverage status of the first UE is ICUE in the carrier set G; or in a case where the cell coverage attribute of the first UE is ICUE and the prioritized synchronization reference source type of the first UE is a Global Navigation Satellite System (GNSS) in the carrier set G, determining the priority order for the first UE to select the synchronization reference source according to the following hierarchy, from high priority to low priority:

a GNSS, a second UE which transmits a Sidelink Synchronization Signal (SLSS) with a Sidelink Synchronization Signal ID SLSSID=0 on a carrier in the carrier set G, and a base station; or in a case where the cell coverage attribute of the first UE is PCUE and the prioritized synchronization reference source type of the first UE is a GNSS in the carrier set G, determining the priority order for a first UE to select a synchronization reference source according to the following hierarchy, from high priority to low priority:

a GNSS, a second UE which transmits an SLSS with an SLSSID=0 on a carrier in the carrier set G, and a base station; or in a case where the cell coverage attribute of the first UE is OCUE and the prioritized synchronization reference source type of the first UE is a base station in the carrier set G, determining the priority order for the first UE to select a synchronization reference source according to the following hierarchy, from high priority to low priority:

a second UE which transmits an SLSS with an SLSSID belonging to a first set on a carrier in the carrier set G, a GNSS, a second UE which transmits an SLSS with an SLSSID=0 on a carrier in the carrier set G, and other second UEs which transmit SLSSs on a carrier in the carrier set G; or in a case where the cell coverage attribute of the first UE is OCUE and the prioritized synchronization reference source type of the first UE is a GNSS in the carrier set G, determining priority order for a first UE to select a synchronization reference source according to the following hierarchy, from high priority to low priority:

a GNSS, a second UE which transmits a Physical Sidelink Broadcast Channel (PSBCH) on a carrier in the carrier set G and a coverage status indication field inCoverage of the PSBCH is set to TRUE, or a second UE which transmits an SLSS on a carrier in the carrier set G and on a subframe which is indicated by a pre-configured parameter a third synchronization transmitting subframe offset syncOffsetIndicator3 a second UE which transmits a PSBCH in the carrier set G and a coverage status indication field inCoverage of the PSBCH is set to FALSE, and other second UEs which transmit SLSSs on a carrier in the carrier set G, and wherein the first set is a set of SLSSIDs for in coverage UE.

9. The method of claim 6, wherein determining the priority order for the first UE to select a synchronization reference source according to the cell coverage attribute of the first UE on all carriers and the prioritized synchronization reference source type of the UE on all carriers comprises:

grouping all carriers into a carrier set G, and determining the priority order for the first UE to select a synchronization reference source, where the cell coverage attribute of the first UE is ICUE and the prioritized synchronization reference source type of the first UE is a GNSS in the carrier set G, according to the following hierarchy, from high priority to low priority:

a GNSS;

a second UE which transmits an SLSS with an SLSSID=0 on a carrier in the carrier set G, or a second UE which transmits an SLSS with an SLSSID=0 on a carrier A in the carrier set G, wherein the cell coverage attribute of the first UE on the carrier A is ICUE or PCUE, or a second UE which transmits an SLSS with an SLSSID=0 on a carrier A in the carrier set G, wherein the cell coverage attribute of the first UE on the carriers A is ICUE or PCUE and a priority of the carrier A indicated by a higher layer is highest; and a reference cell.

10. The method of claim 9, wherein selecting the synchronization reference source according to the priority order comprises:

selecting, according to the priority order, a detected synchronization reference source with a highest priority; and selecting in a case where there are multiple detected UE-type synchronization reference sources with the highest priority, a UE-type synchronization reference source with a highest S-RSRP, or a UE-type synchronization reference source with the highest S-RSRP on a carrier with a highest corresponding service priority, wherein the priority of a service corresponding to the carrier is indicated by higher layer signaling.

11. The method of claim 6, wherein determining the priority order for the first UE to select the synchronization reference source according to the cell coverage attribute of the first UE on all carriers and the prioritized synchronization reference source type of the first UE on all carriers comprises:
grouping all carriers into a carrier set G; and
in a case where the cell coverage attribute of the first UE is PCUE and the prioritized synchronization reference source type of the first UE is a GNSS in the carrier set G, determining the priority order for the first UE to select the synchronization reference source, according to the following hierarchy, from high priority to low priority:
a GNSS;
a second UE which transmits an SLSS with an SLSSID=0 on a carrier in carrier set G, or a second UE which transmits an SLSS with an SLSSID=0 on carrier A in carrier set G, wherein the cell coverage attribute of the first UE on the carrier A is PCUE, or a second UE which transmits an SLSS with an SLSSID=0 on a carrier A in the carrier set G, wherein the cell coverage attribute of the first UE on the carrier A is PCUE and a priority of the carrier A indicated by a higher layer is highest; and
a reference cell.

12. The method of claim 6, wherein determining the priority order for the first UE to select the synchronization reference source according to the cell coverage attribute of the first UE on all carriers and the prioritized synchronization reference source type of the first UE on all carriers comprises:
grouping all carriers into a carrier set G, and
in a case where the cell coverage attribute of the first UE is OCUE and the prioritized synchronization reference source type of the first UE is a base station in the carrier set G, determining the priority order for the first UE to select a synchronization reference source according to the following hierarchy from high priority to low priority:
a second UE which transmits an SLSS with an SLSSID belonging to a first set on a carrier A in the carrier set G and transmits a PSBCH with inCoverage field being set to TRUE on the carrier A;
a second UE which transmits an SLSS with an SLSSID belonging to a first set on a carrier A in the carrier set G and transmits a PSBCH with inCoverage field being set to FALSE on the carrier A;
a GNSS;
a second UE which transmits an SLSS with an SLSSID=0 on a carrier A in the carrier set G and transmits a PSBCH with inCoverage field being set to TRUE on the carrier A, or a second UE which transmits an SLSS with an SLSSID=0 on the carrier A in the carrier set G and on a subframe which is indicated by a pre-configured parameter syncOffsetIndicator3;
a second UE which transmits an SLSS with an SLSSID=0 on a carrier A in the carrier set G and on a subframe which is indicated by a pre-configured parameter syncOffsetIndicator1 or syncOffsetIndicator2 and transmits a PSBCH with inCoverage field being set to FALSE on the carrier A; and
other second UEs which transmit SLSSs on a carrier in the carrier set G, wherein the first set is a set of SLSSIDs for in coverage UE.

13. The method of claim 12, wherein selecting the synchronization reference source according to the priority order comprises:
at least one of:
detecting SLSSs within all SLSSID ranges on all carriers, or
detecting SLSSs within all SLSSID ranges only on a carrier with a highest corresponding service priority, or
detecting SLSSs within all SLSSID ranges only on a carrier which corresponds to a service that needs to be received by a legacy UE, and
selecting the synchronization reference source according to the priority order, wherein a priority of a service corresponding to a carrier is indicated by higher layer.

14. The method of claim 6, wherein determining the priority order for the first UE to select the synchronization reference source according to the cell coverage attribute of the first UE on all carriers and the prioritized synchronization reference source type of the first UE on all carriers comprises:
grouping all carriers into a carrier set G; and
in a case where the cell coverage attribute of the first UE is OCUE and the prioritized synchronization reference source type of the first UE is a GNSS in the carrier set G, determining the priority order for the first UE to select the synchronization reference source, according to the following hierarchy from high priority to low priority:
a GNSS;
a second UE which transmits an SLSS with an SLSSID belonging to a first set or an SLSSID=0 on a carrier A in the carrier set G and transmits a PSBCH with inCoverage field being set to TRUE on the carrier A, or a second UE which transmits an SLSS with an SLSSID=0 on the carrier A in the carrier set G and on a subframe which is indicated by a pre-configured parameter syncOffsetIndicator3;
a second UE which transmits an SLSS with an SLSSID belonging to a first set on a carrier A in the carrier set G and transmits a PSBCH with inCoverage field being set to FALSE on the carrier A; or a second UE which transmits an SLSS with an SLSSID=0 on a carrier A in the carrier set G and on a subframe which is indicated by a pre-configured parameter syncOffsetIndicator1 or syncOffsetIndicator2 and transmits a PSBCH with inCoverage field being set to FALSE on the carrier A, or a second UE which transmits an SLSS with an SLSSID=169 on a carrier A in the carrier set G and transmits a PSBCH with inCoverage field being set to FALSE on the carrier A; and
other second UEs which transmit SLSSs on a carrier in the carrier set G,
wherein the first set is a set of SLSSIDs for in coverage UE.

15. A first user equipment (UE), comprises:
a processor; and
a memory comprising instructions, which when executed by the processor, cause the UE to:
receive, from a second UE, a sidelink synchronization signal (SLSS) and a physical sidelink broadcast channel (PSBCH) on a first carrier,
select the second UE as a synchronization reference source according to a status of the UE on multiple carriers, wherein the status of the first UE is at least one of an in coverage state, an out of coverage state, and a partial coverage state, set a value of a bandwidth parameter of the PSBCH to be transmitted on a second carrier, and transmit the SLSS and the PSBCH on the second carrier based on the selected synchronization reference source and the set value of the bandwidth parameter, wherein the first carrier and the second carrier are different carriers from each other.

* * * * *